(12) United States Patent
Grundmann et al.

(10) Patent No.: US 9,374,532 B2
(45) Date of Patent: Jun. 21, 2016

(54) CASCADED CAMERA MOTION ESTIMATION, ROLLING SHUTTER DETECTION, AND CAMERA SHAKE DETECTION FOR VIDEO STABILIZATION

(71) Applicant: Google Inc., Mountain View, CA (US)

(72) Inventors: Matthias Grundmann, Atlanta, GA (US); Vivek Kwatra, Santa Clara, CA (US); Irfan Essa, Atlanta, GA (US)

(73) Assignee: Google Inc., Mountain View, CA (US)

( * ) Notice: Subject to any disclaimer, the term of this patent is extended or adjusted under 35 U.S.C. 154(b) by 449 days.

(21) Appl. No.: 13/854,819

(22) Filed: Apr. 1, 2013

(65) Prior Publication Data

US 2014/0267801 A1 Sep. 18, 2014

Related U.S. Application Data

(60) Provisional application No. 61/799,985, filed on Mar. 15, 2013.

(51) Int. Cl.
*H04N 5/232* (2006.01)
*G06T 7/20* (2006.01)

(52) U.S. Cl.
CPC ............ *H04N 5/2329* (2013.01); *G06T 7/2033* (2013.01); *G06T 2207/20021* (2013.01); *G06T 2207/30244* (2013.01)

(58) Field of Classification Search
CPC ............. H04N 5/23248; G06T 7/2033; G06T 2207/10016
USPC .................... 382/201, 107; 348/208.4, 208.99
See application file for complete search history.

(56) References Cited

U.S. PATENT DOCUMENTS

| 6,157,677 | A | * | 12/2000 | Martens | .................... G06T 7/20 348/416.1 |
| 7,433,497 | B2 | | 10/2008 | Chen | |
| 8,520,085 | B2 | * | 8/2013 | Chen | .................. H04N 5/23248 348/155 |

(Continued)

FOREIGN PATENT DOCUMENTS

| JP | 07066989 A | * | 3/1995 | ............... H04N 5/14 |
| JP | 2010-252325 A | | 11/2010 | |

OTHER PUBLICATIONS

International Search Report and Written Opinion for International Application No. PCT/US2014/023211, Jul. 17, 2014, 11 pages.

(Continued)

*Primary Examiner* — Roberto Velez
*Assistant Examiner* — Cynthia Segura
(74) *Attorney, Agent, or Firm* — Fenwick & West LLP

(57) ABSTRACT

An easy-to-use online video stabilization system and methods for its use are described. Videos are stabilized after capture, and therefore the stabilization works on all forms of video footage including both legacy video and freshly captured video. In one implementation, the video stabilization system is fully automatic, requiring no input or parameter settings by the user other than the video itself. The video stabilization system uses a cascaded motion model to choose the correction that is applied to different frames of a video. In various implementations, the video stabilization system is capable of detecting and correcting high frequency jitter artifacts, low frequency shake artifacts, rolling shutter artifacts, significant foreground motion, poor lighting, scene cuts, and both long and short videos.

18 Claims, 9 Drawing Sheets

| Model | Translation $F_t^{(0)}$ | → | Similarity $F_t^{(1)}$ | → | Homography $F_t^{(2)}$ | Homog. mixtures $F_t^{(3)}$ |
|---|---|---|---|---|---|---|
| Degrees of freedom | 2 | | 4 | | 8 | 8 × n |
| Accounts for | Translation in x and y | + | Uniform scale and rotation | + | Skew, Non-uniform scale, perspective in x and y | + Rolling shutter wobble |
| Residual shake if valid | Less, but still shaky | | High frequency rigid wobble (mostly perspective) | | Close to none (w/o rolling shutter) or wobble if rolling shutter | Close to none |
| Introduced distortions if invalid | Residual shake | | Residual shake | | Perspective warping errors | Non-rigid wave-like warps |

700

(56) References Cited

U.S. PATENT DOCUMENTS

| | | | | |
|---|---|---|---|---|
| 8,531,535 | B2* | 9/2013 | Kwatra | G06T 7/2033 348/155 |
| 8,860,825 | B2* | 10/2014 | Grundmann | G06T 5/003 348/208.1 |
| 8,879,850 | B2* | 11/2014 | Hsu | H04N 5/21 382/201 |
| 8,948,497 | B2* | 2/2015 | Sebastian | G06T 5/003 345/419 |
| 8,964,041 | B2* | 2/2015 | Forssen | G06T 7/2033 348/208.1 |
| 2002/0030741 | A1 | 3/2002 | Broemmelsiek | G01S 3/7864 348/169 |
| 2006/0215036 | A1* | 9/2006 | Chung | H04N 5/23248 348/208.4 |
| 2007/0002146 | A1* | 1/2007 | Tico | G06T 5/50 348/208.1 |
| 2008/0180535 | A1* | 7/2008 | Habuka | G06T 7/20 348/208.4 |
| 2008/0225127 | A1* | 9/2008 | Ming | H04N 5/2628 348/208.99 |
| 2008/0270569 | A1* | 10/2008 | McBride | G06F 17/30017 709/217 |
| 2008/0273751 | A1* | 11/2008 | Yuan | G06K 9/32 382/103 |
| 2009/0066800 | A1* | 3/2009 | Wei | H04N 5/23254 348/208.99 |
| 2009/0125223 | A1* | 5/2009 | Higgins | G06T 7/2033 701/532 |
| 2009/0213234 | A1* | 8/2009 | Chen | H04N 5/23248 348/208.4 |
| 2010/0079667 | A1* | 4/2010 | Turetken | H04N 7/1037 348/443 |
| 2010/0097398 | A1* | 4/2010 | Tsurumi | G06T 7/0028 345/634 |
| 2010/0118156 | A1* | 5/2010 | Saito | G06T 7/2006 348/208.6 |
| 2010/0166299 | A1* | 7/2010 | Nobori | G06T 7/0071 382/162 |
| 2010/0232709 | A1* | 9/2010 | Zhang | G06T 7/0048 382/201 |
| 2011/0254950 | A1* | 10/2011 | Bibby | G06T 7/0081 348/135 |
| 2011/0267514 | A1* | 11/2011 | D'Angelo | H04N 5/2329 348/296 |
| 2012/0092559 | A1* | 4/2012 | Ubillos | H04N 19/86 348/607 |
| 2012/0105654 | A1* | 5/2012 | Kwatra | G06T 7/2033 348/208.4 |
| 2012/0236169 | A1* | 9/2012 | Oh | G06T 5/50 348/208.4 |
| 2013/0011020 | A1* | 1/2013 | Kamoshida | H04N 5/23267 382/107 |
| 2013/0044230 | A1* | 2/2013 | Zhou | H04N 5/2329 348/208.6 |
| 2013/0076855 | A1* | 3/2013 | Miyamoto | H04N 5/23238 348/36 |
| 2013/0103339 | A1* | 4/2013 | Durst | G01N 23/207 702/104 |
| 2013/0114851 | A1* | 5/2013 | Foote | G06T 7/004 382/103 |
| 2013/0120600 | A1* | 5/2013 | Jin | G01N 7/206 348/208.4 |
| 2013/0128063 | A1* | 5/2013 | Jin | G06T 7/0028 348/208.4 |
| 2013/0128066 | A1* | 5/2013 | Jin | G06T 7/0028 348/208.99 |
| 2013/0163874 | A1* | 6/2013 | Shechtman | G06K 9/6211 382/190 |
| 2013/0286241 | A1* | 10/2013 | Spampinato | H04N 5/23248 348/222.1 |
| 2013/0296707 | A1* | 11/2013 | Anthony | A61B 8/13 600/459 |
| 2014/0071299 | A1* | 3/2014 | Grundmann | G06T 5/003 348/207.1 |
| 2014/0241599 | A1* | 8/2014 | Chen | A61B 5/0033 382/128 |
| 2015/0256755 | A1* | 9/2015 | Wu | H04N 5/23251 348/208.6 |

OTHER PUBLICATIONS

Baker, S., et al., "Removing rolling shutter wobble," IEEE in *CVPR*, 2010, pp. 2392-2399.

Bradski, G., et al., "Learning OpenCv," 2008, 8 Pages, Title page, Cover page, Table of Contents, O'Reilly Media Inc.

Forssen, P.-E., et al., "Rectifying rolling shutter video from hand-held devices," IEEE In *CVPR*, 2010, 8 pages.

Furukawa, Y, et al., "Towards internet-scale multi-view stereo," IEEE in *CVPR*, 2010, pp. 1434-1441.

Gleicher, M. L., et al., "Re-cinematography: Improving the camerawork of casual video," *ACM Transactions on Multimedia Computing, Communications and Applications*, Oct. 2008, pp. 2:1-2:28, vol. 5, No. 1, Article 2.

Grundmann, M., et al., "Auto-directed video stabilization using robust L1 optimal camera paths," *IEEE CVPR*, 2011, pp. 225-232.

Grundmann, M., et al., "Calibration free rolling shutter removal," *IEEE ICCP*, 2012, pp. 1-8.

Hanning, G., et al., Stabilizing cell phone video using inertial measurement sensors. In *IEEE International Workshop on Mobile Vision*, 2011, pp. 1-8.

Hartley, R., et al., "Multiple View Geometry in Computer Vision," 2004, 8 Pages, Title page, Cover page, Table of Contents, Cambridge University Press.

Karpenko, A., et al., "Digital Video Stabilization and Rolling Shutter Correction using Gyroscopes," *Stanford CS Tech Report*, 2011, pp. 1-7.

Liang, C.-K., et al., "Analysis and compensation of rolling shutter effect," *IEEE Trans. on Image Processing*, Aug. 2008, pp. 1323-1330, vol. 17, No. 8.

Liu, F., "Content preserving warps for 3d video stabilization," *InACM SIGGRAPH*, Aug. 2009, p. 44:144:9, vol. 28, No. 3, Article 44.

Liu, F., "Subspace video stabilization," In *ACM Transactions on Graphic*, Jan. 2011, pp. 4:1-4:10, vol. 30, No. 1, Article 4.

Liu, S., et al., "Video stabilization with a depth camera," In *IEEE CVPR*, 2012, pp. 89-95.

Matsushita, Y, et al., "Full-frame video stabilization with motion inpainting," *IEEE Transactions on Pattern Analysis and Machines Intelligence*, Jul. 2006, pp. 1150-1163, vol. 28, No. 7.

Ringaby, E., et al., "Efficient video rectification and stabilization of cell-phones," *Int. J. Comput. Vision*, 2012, pp. 335-352, vol. 96.

Shi, J., et al., "Good features to track," In *IEEE CVPR*, 1994, pp. 593-600.

Szeliski, R., "Computer Vision: Algorithms and Applications," 1st ed., 2010, 19 pages, Title page, Cover page, Table of Contents, Springer-Verlag New York, Inc.

Yang, W., et al., "Discriminative tag learning on youtube videos with latent sub-tags," IEEE In *CVPR*, 2011, pp. 3217-3224.

\* cited by examiner

600

| Model | Translation $F_t^{(0)}$ | Similarity $F_t^{(1)}$ | Homography $F_t^{(2)}$ | Homog. mixtures $F_t^{(3)}$ |
|---|---|---|---|---|
| Degrees of freedom | 2 | 4 | 8 | $8 \times n$ |
| Accounts for | Translation in x and y | + Uniform scale and rotation | + Skew, Non-uniform scale, perspective in x and y | + Rolling shutter wobble |
| Residual shake if valid | Less, but still shaky | High frequency rigid wobble (mostly perspective) | Close to none (w/o rolling shutter) or wobble if rolling shutter | Close to none |
| Introduced distortions if invalid | Residual shake | Residual shake | Perspective warping errors | Non-rigid wave-like warps |

CASCADED CAMERA MOTION ESTIMATION, ROLLING SHUTTER DETECTION, AND CAMERA SHAKE DETECTION FOR VIDEO STABILIZATION

CROSS REFERENCE TO RELATED APPLICATIONS

This application claims the benefit of U.S. Provisional Application No. 61/799,985 entitled "Cascaded Camera Motion Estimation, Rolling Shutter Detection, and Camera Shake Detection for Video Stabilization" filed on Mar. 15, 2013, the contents of which are incorporated by reference herein.

BACKGROUND

1. Field of the Invention

This disclosure generally relates to manipulating video content and more specifically to stabilizing camera motion in video content.

2. Description of the Related Art

The sharing of video content on websites has developed into a worldwide phenomenon, supported by numerous websites. Many thousands of videos are posted every day, and this number is increasing as the tools and opportunities for capturing video become easier to use and more widespread. Millions of people watch the posted videos.

There is often a need to process the posted videos to improve image and audio quality. This processing can involve correcting videos to reduce shaking visible in the video due to undesired motion of the physical camera used to capture the video. For example, with the growth of mobile phone cameras, there has been a significant increase in the uploading and sharing of videos by casual users capturing their daily experiences with their mobile devices. A significant portion of these videos are prone to shaking, as it is difficult to keep hand-held cameras stable, especially when capturing a moving subject or if moving while recording.

While many modern cameras are generally equipped with image stabilizers for still images, the stabilization afforded by them is usually insufficient in the presence of heavy camera-shake or low-frequency motion, such as the shaking induced when the user is walking or running during capture. The amount of casual videos with significant shake is only predicted to increase with the growth of wearable and first-person-view cameras, especially popular for sports and other activities. Most casual users may not have access to, or the inclination to use professional stabilization equipment (e.g., tripods, dollies, steady-cam). Furthermore, legacy videos shot from older cameras or digitized from film could also benefit from stabilization.

Additionally, most casual users also do not have access to professional stabilization software. Further, although such professional stabilization software exists generally, these software programs correct video with varying degrees of quality. Additionally, many of these software programs cannot function without metadata available from the physical camera, or without input from the user regarding how the stabilization should be carried out.

SUMMARY

An easy-to-use online video stabilization system and computer implemented video stabilization methods are described. Videos are stabilized after capture, and therefore the stabilization works on all forms of video footage including both legacy video and recently captured video. In one implementation, the video stabilization system is fully automatic, requiring no input or parameter settings by the user other than the video itself. The video stabilization system uses a cascaded motion model to choose the correction that is applied to different frames of a video. In various implementations, the video stabilization system is capable of detecting and correcting high frequency jitter artifacts, low frequency shake artifacts, rolling shutter artifacts, significant foreground motion, poor lighting, scene cuts, and both long and short videos.

In one embodiment, a camera path is generated at least in part by accessing a video and generating a plurality of tracked features for each of at least two adjacent frames of the video, the tracked features of the adjacent frames indicating an inter-frame motion of the camera. A plurality of motion models are applied to the inter-frame motion of the tracked features to estimate a plurality of properties for each of the applied motion models, the motion models each representing a different type of camera motion comprising a different number of degrees of freedom (DOF). One or more of the motion models are determined to be valid by comparing the properties of the motion models to corresponding thresholds. The camera path is generated between the adjacent frames based on the valid motion models.

In one embodiment, rolling shutter is corrected at least in part by accessing a video and generating a plurality of tracked features for each of at least two adjacent frames of the video, the tracked features of the adjacent frames indicating an inter-frame motion of the camera. A homographic model is applied to the inter frame motion to determine a number of tracked features that are inliers matching the homographic model. A homographic mixture model is applied to the inter frame motion to determine a number of tracked features that are inliers matching the homographic mixture model. If the number of homographic mixture inliers exceeds the number of homographic inliers by a threshold, a stabilized video is made by applying the homographic mixture model to the adjacent frames of the video.

In another embodiment, rolling shutter is corrected at least in part by accessing a video and generating a plurality of tracked features for each of at least two adjacent frames of the video, the tracked features of the adjacent frames indicating an inter-frame motion of the camera. A homographic model is applied to the inter frame motion to determine a number of tracked features that are inliers matching the homographic model. A number of homographic mixture models are applied to the tracked features to determine, for each of the homographic mixture models, a number of tracked features that are inliers matching each homographic mixture model, the homographic mixture models having different rigidities. A least rigid homographic mixture model is determined where the number of homographic mixture inliers exceeds the number of homographic inliers by a threshold specific to that homographic mixture model. A stabilized video is generated by applying the least rigid homographic mixture model to the adjacent frames of the video.

In one embodiment, a video is classified as being likely to benefit from stabilization at least in part by accessing a video and estimating, for a plurality of frames of the video, values of a plurality of degrees of freedom (DOF) of a similarity motion model, each degree of freedom representing a different camera motion of an original camera used to capture the video, the values of the DOFs representing magnitudes of the different camera motions. A spectrogram is generated for each of the DOFs, each spectrogram based on the values of the DOFs over a time window comprising a plurality of adjacent frames of the video. A plurality of shake features are generated based on the spectrograms. The video is classified based on the shake features. The video is then stabilized based on the classification.

BRIEF DESCRIPTION OF THE DRAWINGS

FIG. 7 illustrates a number of motion models each having a different number of degrees of freedom, according to one embodiment.

FIG. 9A illustrates the spectrograms of a first, short-length video 12 windows in length, and FIG. 9B illustrates the spectrograms of a second, longer-length video 40 windows in length, according to one embodiment.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

I. Overview

Figure 1:
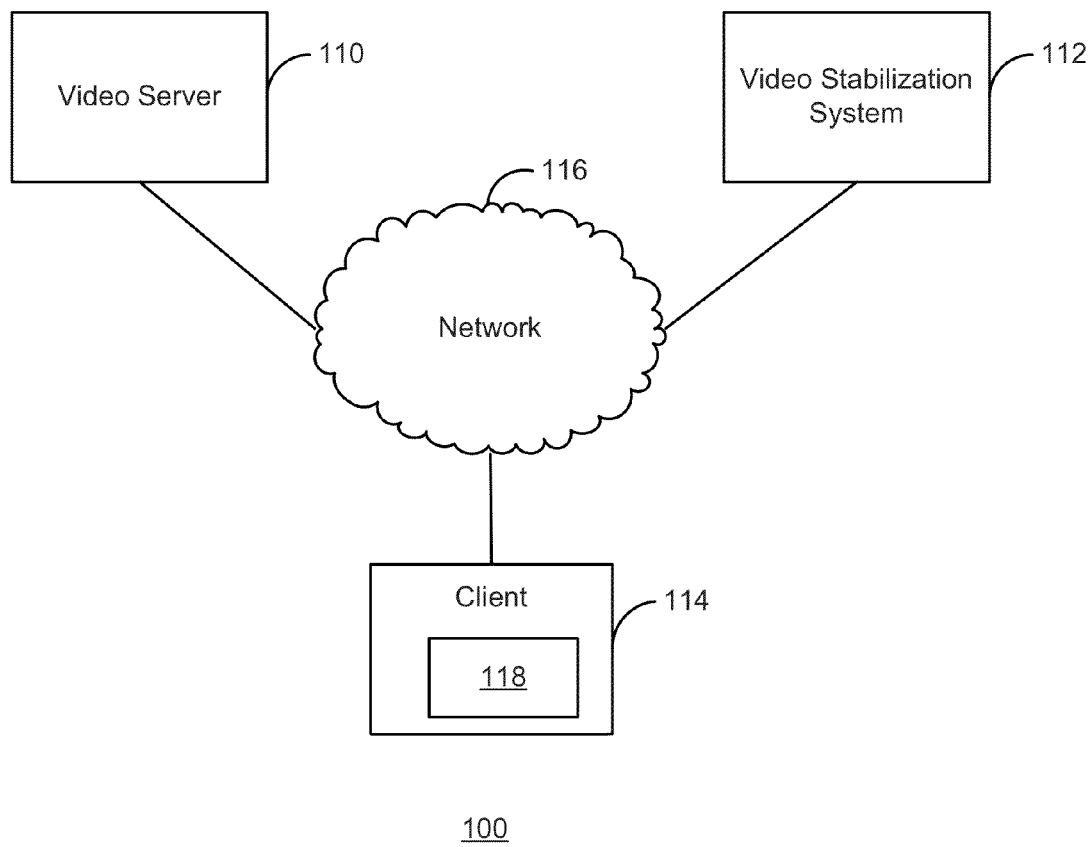
FIG. 1 is a high-level block diagram of a computing environment including a video stabilization system, according to one embodiment.

FIG. 1 is a high-level block diagram of a computing environment including a video stabilization system, according to one embodiment. FIG. 1 illustrates a video server 110, a video stabilization system 112 (the "stabilization system") and a client 114 connected by a network 116. Only one client 114 is shown in FIG. 1 in order to simplify and clarify the description. Embodiments of the computing environment 100 can have thousands or millions of clients 114, as well as multiple video server 110 and stabilization systems 112.

The video server 110 serves video content (referred to herein as "videos") to clients 114 via the network 116. In one embodiment, the video server 110 is located at a website provided by YOUTUBE™, although the video server can also be provided by another entity. The video server 110 includes a database storing multiple videos and a web server for interacting with clients 114. The video server 110 receives requests from users of clients 114 for the videos in the database and serves the videos in response. In addition, the video server 110 can receive, store, process (e.g., stabilize) and serve videos posted by users of the clients 114 and by other entities.

The client 114 is a computer or other electronic device used by one or more users to perform activities including uploading videos, initiating the stabilization of videos using the stabilization system 112, and viewing videos and other content received from the video server 110. The client 114, for example, can be a personal computer executing a web browser 118 that allows the user to browse and search for videos available at the video server web site. In other embodiments, the client 114 is a network-capable device other than a computer, such as a personal digital assistant (PDA), a mobile telephone, a pager, a television "set-top box," etc.

The network 116 enables communications among the entities connected to it. In one embodiment, the network 116 is the Internet and uses standard communications technologies and/or protocols. Thus, the network 116 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 116 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 116 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

The stabilization system 112 is configured to receive an input video and to stabilize it by altering the pixel content of the frames of the video. The stabilization system 112 outputs a stabilized video. As part of the stabilization process, the stabilization system 112 determines a camera path describing the two dimensional (2D) motion of the camera originally used to record the video. The stabilization system 112 may also output this camera path separately from using it merely to stabilize the video. To stabilize the video, the camera path is used to negate, to the extent possible, the motion of pixels in the frames of the video due to the motion of the camera. In one embodiment, the output stabilized video is a copy of the original video where the positions of the pixels of each frame are adjusted to counteract the motion between frames according to the determined camera path.

Figure 2:
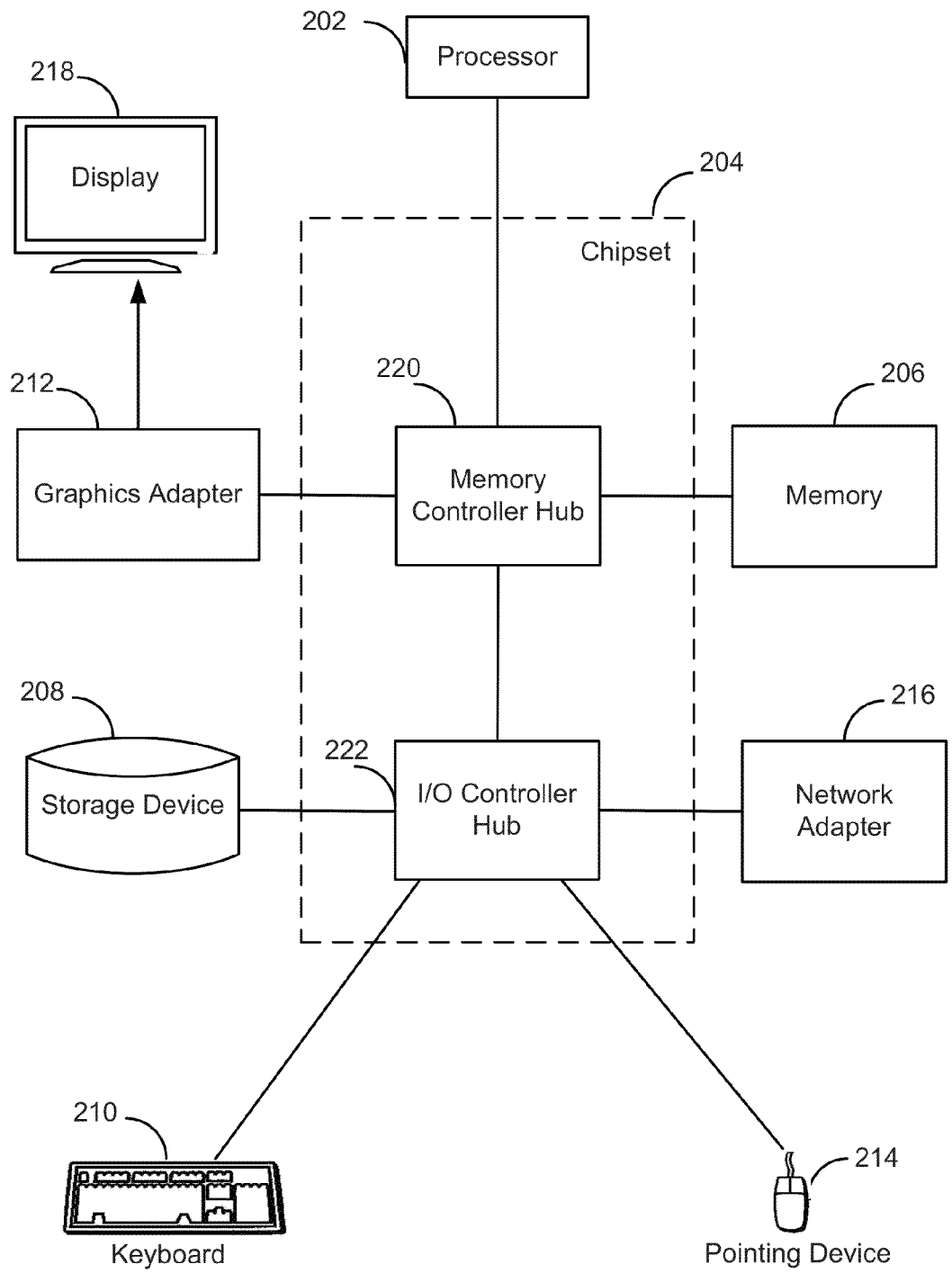
FIG. 2 is a high-level block diagram illustrating an example of a computer for use as a video stabilization system, video server, and/or client.

FIG. 2 is a high-level block diagram illustrating an example of a computer 200 for use as a video server 110, stabilization system 112, and/or client 114. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display device 218. The network adapter 216 couples the computer system 200 to the network 116. Some embodiments of the computer 200 have different and/or other components than those shown in FIG. 2.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The types of computers 200 used by the entities of FIG. 1 can vary depending upon the embodiment and the processing power used by the entity. For example, a client 114 that is a mobile telephone typically has limited processing power, a small display 218, and might lack a pointing device 214. The stabilization system 112, in contrast, may comprise multiple servers working together to provide the functionality described herein. As will be apparent from the description below, the operations of the stabilization system 112 to stabilize a video are sufficiently complex as to require their implementation by a computer, and thus cannot be performed entirely mentally by the human mind.

II. Video Stabilization

Figure 3:
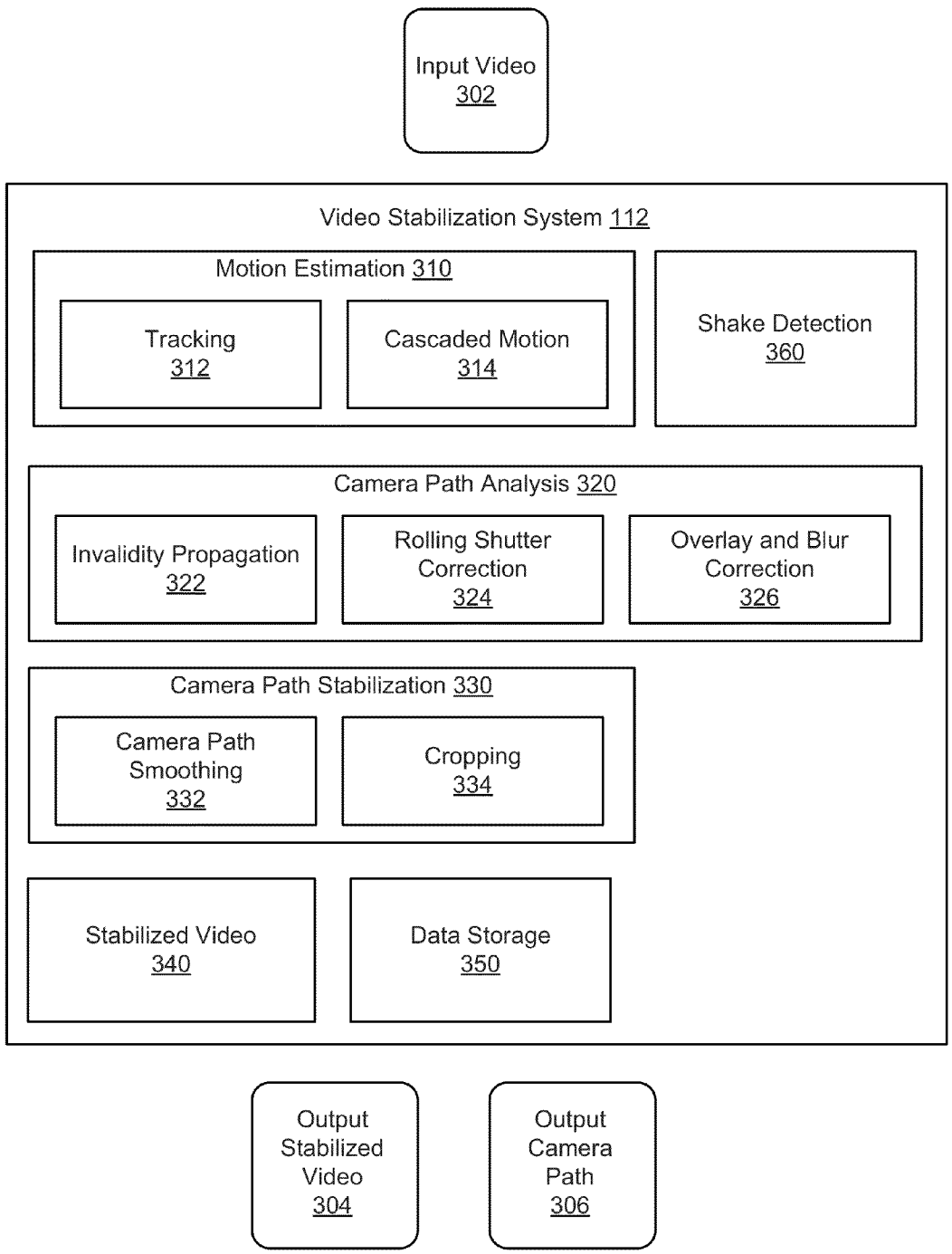
FIG. 3 is a high-level block diagram illustrating modules within the video stabilization system, according to one embodiment.

FIG. 3 is a high-level block diagram illustrating modules within the video stabilization system 112, according to one embodiment. As introduced above, the stabilization system 112 is configured to receive an input video 302, to stabilize the video, and output the stabilized video 304 and/or the camera path 306.

In one embodiment, the stabilization system 112 includes a motion estimation system module 310, a camera path analysis module 320, a camera path stabilization module 330, a stabilized video generation module 340, a data storage module 350, and a shake detection module 360. Some embodiments of the stabilization system 112 have different and/or additional modules than the ones described here. Similarly, the functions can be distributed among the modules in a different manner than is described here. Certain modules and functions can be incorporated into other modules of the stabilization system 112 and/or other entities on the network 116, including the video server 110 and client 114.

The data storage module 350 stores data used by the various modules of the stabilization system 112. The stored data include, for example, frames and/or other portions of videos being operated upon, tracked features, estimated motion models, properties and thresholds related to the stabilization process, camera paths, and other intermediate items of data created during the stabilization process. This list is intended to be exemplary and not exhaustive.

II.A. Motion Estimation

The motion estimation module 310 analyzes the frames of the input video 302 to characterize the original 2D camera motion of the camera used to capture the input video 302, and to provide that characterized output as a camera path, and is one means for performing this function. For a pair of adjacent frames $I_t$ and $I_{t+1}$ representing times t and t+1 in the video, respectively, the motion estimation module 310 characterizes the camera path based on the movement of a set of tracked features $T_t$, $T_{t+1}$ from their initial locations in frame $I_t$ to their final locations in frame $I_{t+1}$. The set of tracked features T is generated from the underlying pixels of each frame, and their movement between adjacent frames is represented as a set of inter-frame motions $M_t$. Using the inter-frame motions $M_t$, the motion estimation module 310 estimates a set of motion models $F_t$ for frame $I_t$, where the application of the estimated motion models $F_t$ to the pixels of frame $I_t$ describes the motion of the pixels between frame $I_t$ and $I_{t+1}$.

However, not all of the estimated motion models will validly characterize the inter-frame motion of the pixels, and thus the motion estimation module 310 is further configured to determine which estimation motion models are valid for use in the camera path between frames $I_t$ and $I_{t+1}$. Only the valid motion models for each frame pair are used in the camera path. In one embodiment, to determine the camera path the motion estimation module 310 includes a tracking module 312 and a cascaded motion module 314. As motion estimation is performed at the level of frame pairs, motion estimation can be parallelized by distributing motion estimation across several computers running in parallel on different parts (or clips) of the video.

II.A.i. Tracking

The tracking module 312 is configured to generate a set of tracked features $T_t$ for each frame $I_t$ of the input video 312, and is one means for performing this function. The tracked features act as markers for objects appearing in a video frame. The tracking module 312 tracks the motion of individual tracked features between frame pairs to track how objects in the video move between frames. In aggregate, the motion $M_t$ of the tracked features between a pair of adjacent frames can be analyzed to separate object motion within the frame from motion of the capturing camera.

The tracking module 312 generates the tracked features $T_t$ for a frame by applying a corner measure to the pixels of the frame (e.g., a Harris corner measure). The corner measure generates a tracked feature at each pixel in the frame where a "corner" appears, that is, where the vertical and horizontal lines of significant gradient in pixel color meet. More specifically, the tracked features are located at pixels where the minimum eigenvalue of the auto-correlation matrix of the gradient of the frame is above a threshold after non-maxima suppression. The tracked features may be stored as a set of two-dimensional (2D) points, each tracked feature having an x and y axis coordinate within the Cartesian coordinate system of the frame of the video. Thus, the i-th tracked feature $T_{t,i}$ of a frame and its motion $M_{t,i}$ to frame $I_{t+1}$ may be represented as:

$$T_{t,i} = \begin{bmatrix} x \\ y \end{bmatrix}, M_{t,i} = \begin{bmatrix} \Delta x \\ \Delta y \end{bmatrix} \quad (0)$$

Further, in generating the tracked features the tracking module 312 may divide the frame into multiple layers of grids having different sizes (e.g., 4×4 or 16 grids total, 8×8 grids, and 16×16 grids). The gradient threshold for what may be considered a tracked feature may set on a per-grid basis to normalize the number of tracked features generated per cell of the grid. This helps balance the number of tracked features arising out of each portion of the frame, so that the tracked features are not overly representative of some cells over others. That way, cells with large amounts of color change over a relatively short distance will not necessarily have more tracked features than cells that are more uniform in color. An absolute minimum threshold may be enforced to address homogeneous regions of a frame. The absolute minimum threshold may conclude that particular regions may lack tracked features. Tracked features that are in close proximity to other tracked features (e.g., within 5 pixels) may be aggregated or filtered in order to ensure that the tracked features are spread out within a cell, and within the frame as a whole.

Figure 6:
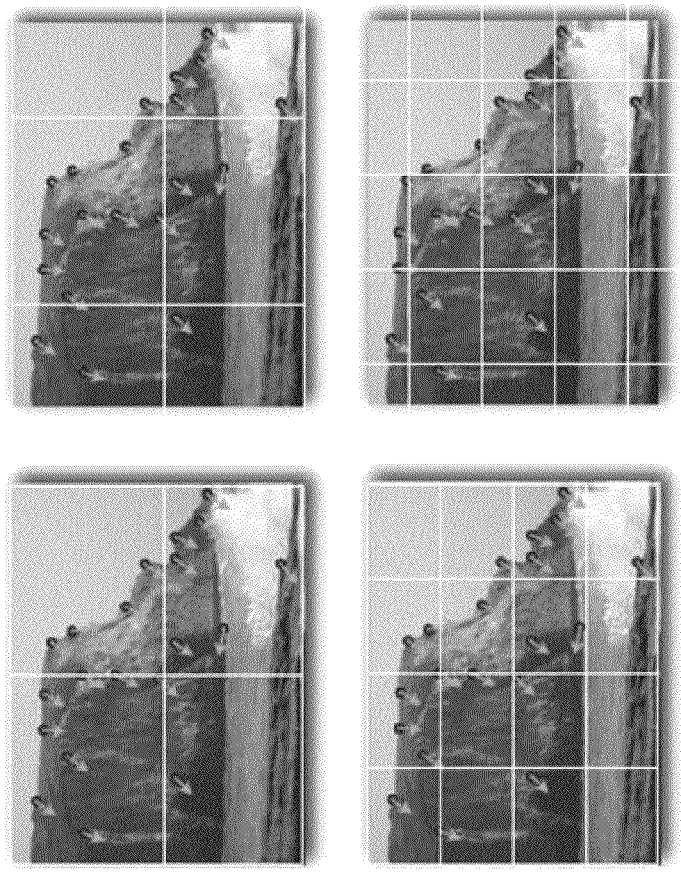
FIG. 6 illustrates motion of example tracked features and their motion within a frame, according to one embodiment.

FIG. 6 illustrates motion of example tracked features and their motion $M_t$ within a frame, according to one embodiment. Generally, at least some of the tracked features will exhibit motions that are inconsistent with the motion other nearby tracked features. The tracked features are analyzed to identify and filter out these outlier tracked features. Inconsistent motion can include, for example, a tracked feature $T_{t,i}$ moving $M_{t,i}$ in substantially different (e.g., opposite) direction from other nearby tracked features. The threshold for what represents a different direction and what represents nearby is determined several times at several different levels. Several levels of grids (e.g., 4×4 or 16 grids total, 8×8 grids, and 16×16 grids) are used as introduced above, where each level of grid has a different threshold for what constitutes a nearby tracked feature and what constitutes a substantially different direction.

Generally, tracked features within a cell of a grid are considered nearby. The direction of motion of the tracked features of a cell is determined based on an aggregate (e.g., an average) of the directions of motions of each of the tracked features of that cell. The threshold tolerance for a substantially different direction may be set very high (e.g., requiring a high amount of uniformity) between tracked features for larger grids (e.g., 16×16), and may be set comparatively lower (e.g., requiring less uniformity) between tracked features for smaller grids (e.g., 4×4). Tracked features not meeting the directionality threshold at one or more levels are thrown out. In one embodiment, tracked features are filtered using a random sample consensus (RANSAC) algorithm.

For example, all but one tracked feature in an example grid may exhibit leftward translation, whereas the remaining tracked feature exhibits rightward translation. Consequently, the rightward moving tracked feature may be filtered and not considered in further processing.

II.A.ii. Cascaded Motion Estimation

The cascaded motion module 314 is configured to use the set of inter-frame motions $M_t$ of the set of tracked features $T_t$ between pairs of adjacent frames to determine the original camera path, and is one means for performing this function. To do this, the cascaded motion module 314 fits the set of inter-frame motions $M_t$ to a set of linear motion models $F_t$. Each of the motion models represents a different type of motion having a different number of degrees of freedom (DOF). The output camera path of the cascaded motion module 314 is, for each pair of frames, the estimated motion models that are determined to be valid representations of the inter-frame motions.

For convenience, the set of motion models determined valid for a pair of adjacent frames $I_t$ and $I_{t+1}$ are assigned to the second frame, $I_{t+1}$, in the pair. Generally, a set of valid motion models is determined assigned for each frame in the video except the first, as there is no motion to be analyzed in the first frame of the video. For the first frame of the video, an identity motion model is used for initialization. As will be described below, applying the valid motion models of frame h is at least part of the process used to generate stabilized video frame $J_{t+1}$, which is frame $I_{t+1}$ stabilized for the original camera motion. In an alternative embodiment, the set of valid motion models may be assigned to the first frame in the pair instead.

II.A.ii.a Estimating Motion Models

FIG. 7 illustrates a number of motion models each having a different number of degrees of freedom, according to one embodiment. In one embodiment, at least four motion models $F_t^{(k)}$ are considered. The first motion model $F_t^{(0)}$ is a translation model having two degrees of freedom for detecting motion along the x and y axes of the frame. The second motion model $F_t^{(1)}$ is a similarity model with four degrees of freedom for detecting rotations and uniform scaling (e.g., size of the frame), as well as for detecting translation. The third motion model $F_t^{(2)}$ is a is a homographic model having eight degrees of freedom for detecting perspective effects, skew, non-uniform scales, as well as for detecting similarities and translations. The fourth motion model $F_t^{(3)}$ is a homographic mixture model with 8×n degrees of freedom, where n is the number of mixtures in the homographic mixture model. In one embodiment, n=10. The homographic mixture model detects rolling shutter distortions (e.g., wobble), in addition to detecting homographies, similarities, and translations. Thus, as the number of DOFs of a motion model increase, each motion model includes new degrees of freedom representing a new type of camera and also includes DOFs for the motions represented by the lower DOF motion models. Exemplary motion models are further described below.

The motion models are each configurable with their own parameters, where each parameter represents one of the DOF of the motion model. Thus, two different translations between two different frame pairs will fit two different translation models $F^{(0)}$, each having their own parameter (or DOF) configurations. The cascaded motion module 314 estimates the parameters of the motion models to determine the configuration of each motion model that best fits the inter-frame motions $M_t$. Once the parameters for the motion models have been estimated, the estimated motion models can be evaluated to determine whether or not they are the "correct" models to be applied. That is, they are evaluated for validity to determine whether or not they represent the motion $M_t$ of tracked features between frames. This is further described below in the next section.

To estimate the parameters of each motion model with respect to inter-frame motion $M_t$, the parameters of a given motion model are determined so as to minimize:

$$\Sigma_i \|(T_{t,i}+M_{t,i})-F(T_{t,i})\|_p \quad (1)$$

where each i represents an inter-frame motion between two corresponding tracked features of a frame pair, and where p is an order of a normalizing factor (e.g., p=2 for a Euclidean norm). More specifically, in one embodiment the motion models are fit to the inter-frame motion using an iterative re-weighted least squares function:

$$\sum_i w_i \|(T_{t,i}+M_{t,i})-F(T_{t,i})\|_2, \quad (2)$$

where $$w_i = \frac{1}{\|(T_{t,i}+M_{t,i})-F(T_{t,i})\|_1}$$

and where $w_i$ are inverse fitting error weights. The larger the value of $w_i$, the better the fit. Inlier tracked features fitting the model have values much greater than 1, and outliers have small weights having values close to or less than 1. The parameters each motion model $F_t$ are estimated by minimizing the sum of Eq. 2.

The parameters (DOF) of each motion model are as follows. The translation motion model $F_t^{(0)}$ is estimated as the weighted average translation of the tracked features with weights $w_i$ such that:

$$F_t^{(0)} = \begin{bmatrix} 1 & 0 & t^x \\ 0 & 1 & t^y \\ 0 & 0 & 1 \end{bmatrix} \quad (3)$$

where $t^x$ and $t^y$ represent the magnitude of translation of the camera along the x and y axes, respectively. The magnitude of translation may be expressed in pixels or as a percent of the frame width/height before cropping. As above, the values of $t^x$ and $t^y$ can also be said to represent the values of the DOFs of the translation model for that frame.

The similarity motion model FP) is estimated such that:

$$F_t^{(1)} = \begin{bmatrix} a & -b & t^x \\ b & a & t^y \\ 0 & 0 & 1 \end{bmatrix} \quad (4)$$

where a is a frame-constant scale parameter, b represents rotation, and t are translations in x and y.

The homographic model $F_t^{(2)}$ is estimated using a 3×3 matrix, where up-to-scale ambiguity is resolved by normalizing the matrix elements such that $h_{33}$ equals 1. The matrix elements of the homographic model are estimated using a weighted version of the non-homogeneous direct linear transformation (DLT) algorithm solved via QR decomposition.

$$F_t^{(2)} = \begin{bmatrix} a & b & t^x \\ c & d & t^y \\ w_1 & w_2 & 1 \end{bmatrix} \quad (5)$$

where, assuming small inter-frame rotation and scale, $w^T = (w_1, w_2)^T$ is the frame-constant perspective part, a and d are frame-constant scale parameters, t are translations in x and y, and c and b are rotation and skew, respectively.

The homographic mixture model $F_t^{(3)}$ is estimated using a mixture of a number (e.g., 10) of different homographic models, as well as a regularizer that may vary in value between different implementations. The homographic mixture model applies a different homographic model to each portion of the frame. More specifically, a block is a set of consecutive scan lines in a frame, where the total number of scan lines in the frame is partitioned into 10 blocks of scan lines. Thus, a different homographic model is applied to each block. The regularizer affects the rigidity of the homographic mixture model. For example, a regularizer value of a sufficiently high value (e.g., 1) causes the homographic mixture model to be rigid, making it identical to the homographic model $F_t^{(2)}$. A smaller regularizer value (e.g., between 0 and 1) increases the contribution of the other mixtures/blocks, causing the homographic mixture model to better model a rolling shutter wobble in the inter-frame motion.

The homographic mixture model $F_t^{(3)}$ is represented by $$F_t^{(3)} = \begin{bmatrix} a & b_k & t_k^x \\ c_k & d & t_k^y \\ w_1 & w_2 & 1 \end{bmatrix}, k = 1 \ldots 10 \quad (6)$$

where $w^T = (w_1, w_2)^T$ is the frame-constant perspective part, a and d are frame-constant scale parameters, $t_k$ are block-varying translations in x and y, and $c_k$ and $b_k$ are block-varying rotation and skew. For 10 blocks (k), $F_t^{(3)}$ has 4×10+4=44 degrees of freedom.

The tracked features $T_t$ contributing to the inter-frame motions $M_t$ are filtered prior to estimation of the homographic $F_t^{(2)}$ and homographic mixture model $F_t^{(3)}$ parameters. To perform this filtering, the parameters for the similarity model $F_t^{(1)}$ are estimated first. A set of one or more tracked features not matching the estimated similarity model are determined. These non-matching tracked features are filtered from use in estimating the homographic and homographic mixture model parameters, for at least the first iteration of Eq. 2. This may be accomplished, for example, by setting their weights $w_i$ to zero. This helps insulate the parameters of the homographic and homographic mixture models against significant foreground motions (e.g., motions very close to the camera).

In determining the parameters of the models, the weights of the tracked features may, in an alternative embodiment, be biased to give greater weight to tracked features near the edge of frame, and to give less weight to tracked features near the center of the frame. This may be accomplished, for example, using an inverted Gaussian function along the x and y coordinate axes of the frame. This is based on a prediction that faces and other objects close to the camera frame tend to be centered with respect to the frame.

II.A.ii.b Determining the Valid Estimated Motion Models

The inter-frame motions $M_t$ of tracked features $T_t$ between any given pair of frames may look like any, some, all, or none of the estimated motion models. For example, if the scene is strictly non-planar (e.g. due to different depth layers or significant foreground motions) the translation motion model will be insufficient in describing the motion (with the translation model generating the least number of stabilization artifacts relative to the other motion models). Application of the correct (or valid) set of motion models to the inter-frame motion will stabilize those frames and remove at least some destabilizations, resulting in residual shake. Application of incorrect models introduces distortions into both the camera path and the stabilized video that were not originally present.

More specifically, if the translation model is valid, the result of its application will be a reduction of shake. If the translation model is invalid, the result of its application will be additional shake distortion. If the similarity model is valid, the result of its application will be the introduction of high frequency rigid wobble residual shake (mostly perspective in nature). If the similarity model is invalid, the result of its application will be additional shake distortion. If the homographic model is valid, the result of its application will be close to none residual shake if there is no rolling shutter present, and wobble residual shake if there is rolling shutter present. If the homographic model is invalid, the result of its application will be perspective warping errors. If the homographic mixture model is valid, the result of its application will be close to none residual shake. If the homographic mixture model is invalid, the result of its application will be non-rigid wave-like warp distortions.

Once the cascaded motion module 314 has computed the parameters for the set of motion models $F_t$, the motion models are fit to the set of tracked features $T_t$, $T_{t+1}$ and inter-frame motions $M_t$ to determine which motion models $F_t$ validly match the inter-frame motion. Generally, a motion model is considered to be valid with respect to an inter-frame motion if the type of motion represented by the motion model matches the exhibited inter-frame motion with respect to one or more properties. These properties represent the degree of fit between the motion model and the inter-frame motions. The properties differ among the motion models.

Table 1 illustrates an example set of properties for validity evaluation, according to one embodiment. Table 1 includes the motion models, the properties relevant to each motion model, and a threshold. Some properties are simply the parameters of the motion models estimated for the inter-frame motions. Others properties are derivable from the fit of the estimated motion model to the tracked features $T_t$, $T_{t+1}$ and inter-frame motions $M_t$. Tracked features matching the model may be referred to as inliers, and tracked features not matching the model may be referred to as outliers. A tracked feature is an inlier if it fits the estimated motion model to within a threshold tolerance. For example, if the motion model predicted the motion $M_{t,i}$ of a tracked feature $T_{t,i}$ between to within 1.5 pixels of accuracy, than the tracked feature may be considered an inlier.

In one embodiment, if a single property does not meet its corresponding threshold, the motion model is invalid. In other embodiments, other properties, thresholds, and requirements may be defined for determining whether or not a motion model is valid.

| Motion Model | Property | Threshold |
|---|---|---|
| Translation | Number of tracked features | >3 m.f. |
| | Translation magnitude as a percentage of frame diameter | <15% |
| | Standard deviation of translation as a percentage of frame diameter | <7% |
| | Acceleration: Current translation over median translation | <20 pixels |
| Similarity | Number of tracked features | >30 m.f. |
| | Feature coverage as a percentage of frame area | >15% |
| | Scale change | <25% |
| | Change in rotation | <20° |
| Homographic | Scale change | <20% |
| | Change in rotation | <15° |
| | Grid coverage | >30% |
| Homographic Mixture | Inlier block definition: block coverage | >40% |
| | Adjacent outlier blocks | <5 |
| | Empty blocks (too few tracked features) | <3 |

Regarding translation properties, the number of tracked features is the total number of tracked feature inliers. The translation magnitude is the amount of inter-frame motion estimated by the translation model. This may be determined, for example, from a translation magnitude parameter of the motion model. Standard deviation of translation may be determined based on the individual translations of the tracked features between frames. Acceleration may be determined based on the average pixel shift of the tracked features between a pair of frames relative the median of the average pixel shift from one or more previous frame pairs (e.g., 5 previous frame pairs).

Regarding similarity properties, the number of tracked features is the same as for the translation model. The feature coverage as a percentage of frame area is determined by placing a box having a fixed size around each feature and by taking the union of all the boxes. The area within the union of the boxes is compared against the total frame area to determine the feature coverage. The scale change and rotation properties may be determined based scale change and rotation parameters, respectively, of the similarity model.

Regarding homographic properties, the scale change and change in rotation properties are the same as in the similarity model. The homographic properties may also include a perspective property that may be determined based on a change in perspective parameter from the homographic model. The threshold for the perspective property is based on a per-normalization, is unit-less, and may, for example, be $4 \times 10^{-4}$ in value. The grid coverage property represents a calculation of the amount of the frame that is covered by inlier tracked features. The grid coverage property is determined by overlaying a grid (e.g., 10×10) over the tracked features of the frame pair. For each cell (or bin) of the grid, a score is determined whether the bin is an inlier or outlier bin. The bin score is based on whether the tracked features in the bin are inliers or outliers with respect to the homographic model, and based on the weights $w_i$ of the tracked features in the bin, specifically based on the median $b_j$ of the feature weights of the tracked features in the bin. In one embodiment, the score of a bin j is determined based on $$\hat{b}_J = \frac{1}{1 + e^{(-a(b_j - 1))}} \tag{7}$$

where a and $b_j$ are scaling factors for the logistic regression scoring functions. Grid coverage $G_t$ is an average over all bin scores, such that $$G_t = \frac{1}{N} \sum_{j=1}^{N} \hat{b}_J \tag{8}$$

If $G_t$ is too low, the grid coverage property is too low (e.g., below 30% of the bins) and thus the homographic model may be considered invalid.

Regarding homographic mixture properties, the block coverage property is similar to the grid coverage property above. Here, instead of a single per-frame grid coverage score, each block of the mixture is assigned its own block coverage score. Specifically, for 1×10 grid is overlaid on the tracked features, each bin (10 bins total) corresponds to one of the blocks. Each block thus covers a number of scan lines in the frame. A score is determined for each bin/block based on the weights of the tracked features and whether or not they are inliers. A block is considered an outlier block if its coverage is below a threshold, for example 40%. The adjacent outlier blocks properties indicates the number of adjacent blocks that are outliers. If too many are outliers, the property is invalid. The empty block property indicates the number of blocks having few (e.g., below a threshold) or no tracked features. If too many blocks have too few tracked features, insufficient data is available to fully validate the homographic mixture, and consequently the homographic mixture model is considered invalid.

To streamline the estimation of motion models, the motion models are estimated, and evaluated for validity with respect to the inter-frame motion in a sequenced order, starting with the translation model and increasing in number of DOF from there. If the translation model is determined to be valid, the similarity model is considered. If the similarity model is determined to be valid, the homographic model is considered, and so on. At any point, if a model is determined to be invalid, the process is stopped and the previous model/s that was/were considered valid are used as part of the camera path for that frame. If no motion model is valid, an identity motion model used which assumes the camera path did not move (e.g., no stabilization is performed). This streamlining is efficient because often if a lower DOF motion model is invalid, it is likely that the higher DOF motion models will also be invalid.

II.B. Camera Path Analysis

The camera path analysis module 320 receives the tracked features and the valid estimated motion models from the motion estimation module 310. Generally, the camera path analysis module 320 uses these inputs to address stabilization issues that occur over a longer time span than can be detected at the inter-frame time span, for example stabilization issues that occur over hundreds of milliseconds to seconds of video. The camera path analysis module 320 performs corrections by changing the estimated motion models that are considered valid on a frame by frame basis, and by flagging frames that exhibit particular characteristics. In one embodiment, the camera path analysis module 320 includes an invalidity propagation module 322, a rolling shutter correction module 324, and an overlay and blur correction module 326.

II.B.i. Invalidity Propagation

The invalidity propagation module 322 is configured to smooth out the camera path over longer stretches of frames for temporal stability, and is one means for performing this function. This is based on the assumption that instabilities generally occur over multiple pairs of frames rather than in between two frames. For example, if the highest DOF valid motion model at t−1 is the homographic mixture model, at t it is the similarity model, and at t+1 it is the homographic mixture model, it is unlikely that the cause of the invalidity of the higher DOF models at t occurred only within the two frame time span between the frame time t and the frame at time t+1.

To smooth out the camera path, the number of DOF of the highest DOF valid model at a given frame pair is propagated to a number of nearby frame pairs. Using the example above, the highest DOF valid model at time t may be the similarity model. For a number (e.g., 3) of preceding and following frame pairs, (e.g., t±1, t±2, and t±3), the invalidity propagation module 322 compares the number of DOF of the highest DOF valid model at that preceding or subsequent time with the number of DOF of the highest DOF valid model at time t. If the number of DOF at time t is lower, the highest valid DOF model at the previous or subsequent time is downgraded (in terms of DOF) to match the number of DOF at time t. Continuing with the example introduced above, using invalidity propagation the highest DOF valid model at times t−1 and t+1 would be downgraded from the homographic mixture model to the similarity model.

In performing this propagation, only the number of DOF is propagated to the prior frames, the actual motion model used at these previous and subsequent times is the motion model previously estimated for that frame having that number of DOFs. This is because the motion between each frame pair is expected to differ, often significantly, and thus the parameters of a motion model calculated at one point in time will generally not apply to another frame pair. Further, invalidity propagation is generally not performed multiple times, otherwise all frames would end up with the motion model of the frame having the lowest number of DOF that is still valid.

The output of the invalidity propagation module 322 is a set valid estimated motion models that is different from the set of valid motion models received from the motion estimation module 310.

II.B.ii. Rolling Shutter Correction

The rolling shutter correction module 324 is configured to analyze tracking features $T_t$, $T_{t+1}$ and inter-frame motions $M_t$ to detect and correct rolling shutter distortions, and is one means for performing this function. The rolling shutter correction module 324 does not require any information from the original capturing camera regarding how the video was captured, or how the camera moved during capture. Rolling shutter occurs when not all parts of a frame are recorded at the same time by the camera capturing the video. While this can be a deliberately generated effect in single image capture use cases, it is generally undesirable in videos. Rolling shutter can result in several different effects, including wobble, skew, smear, and partial exposure. Generally, rolling shutter effects occur as a result of an object moving quickly within the frame during frame capture, such that the object appears to wobbles, appears skewed, etc.

II.B.ii.a Detecting Rolling Shutter

To detect rolling shutter effects between a frame pair, the rolling shutter correction module 324 is configured to apply the homographic model $F_t^{(2)}$ estimated for that frame pair to the tracked features of that frame pair. A number of homographic inliers are determined, where a homographic inlier is a tracked feature i where the corresponding motion $M_{t,i}$ matches the motion estimated by homographic model for that frame pair to within a threshold number of pixels. For example, if the threshold is within 1.5 pixels a tracked feature i is an inlier if between the two frames in the pair, the tracked feature moved $M_{t,i}$ in x and y as expected by the estimated homographic model to within 1.5 pixels of accuracy. In this example, the feature's weight $w_i$ would be 1/1.5=0.66667. A number of homographic mixture inliers are also determined in the same manner, except the homographic mixture model $F_t^{(3)}$ is used in place of the homographic model $F_t^{(2)}$.

The tracked features inliers are grouped into grids to determine separate grid coverages for both the homographic inliers and homographic mixture inliers. The determination of grid coverage is similar to that described above, but is repeated for clarity below. A grid (e.g., 10×10) is overlaid over the frame. Each tracked feature is located in one bin, based on its coordinate location within the frame and the boundaries of the individual bins, as the bins do not overlap. For each cell (or bin) of the grid, two scores are determined, a homographic bin score and a homographic mixture bin score. The homographic bin score determines whether the bin is a homographic inlier or outlier. Similarly, the homographic mixture bin score determines whether the bin is a homographic mixture inlier or outlier. Each score is based on the number of tracked features in the bin that are inliers or outliers with respect to either the homographic model or the homographic mixture. The scores are further weighted based on the weights $w_i$ of the tracked features in the bin, specifically based on the median $b_j$ of the feature weights of the tracked features in the bin. In one embodiment, the score of a bin j for either case is determined based on $$\hat{b}_j = \frac{1}{1 + e^{(-a(b_j - 1))}} \qquad (9)$$

where a and $b_j$ are scaling factors for the logistic regression scoring functions. Grid coverage $G_t$ is an average over all bin scores, such that $$G_t = \frac{1}{N} \sum_{j=1}^{N} \hat{b}_j \qquad (10)$$

Two grid coverages are determined, a homographic grid coverage $G_t^{(2)}$ and a homographic mixture grid coverage $G_t^{(3)}$, each based on their respective bin scores.

Generally, the homographic mixture model models rolling shutter better than the homographic model. Consequently, generally the homographic mixture has a higher grid coverage $G_t^{(3)}$ than the homographic model's grid coverage $G_t^{(2)}$ when a rolling shutter effect is present. In one embodiment, the rolling shutter correction module uses a rolling shutter boost estimate $rse_t$ to detect a rolling shutter effect where, the boost $rse_t$ is the ratio:

$$rse_t = \frac{G_t^{(3)}}{G_t^{(2)}} \qquad (11)$$

A boost $rse_t$ greater than 1 generally signifies that the homographic mixture model is detecting some motion (e.g., rolling shutter) that the homographic model is not capturing. Thus, the homographic mixture model is considered to "boost" the response of the homographic model. In one embodiment, the rolling shutter correction module 324 is configured to determine that there is a rolling shutter at time t responsive to the boost $rse_t$ being above a boost threshold (e.g., 1.1, 1.3, 1.4, 1.9, etc.).

Generally, rolling shutter effects occur over multiple frames (e.g., on the order of hundreds of milliseconds to seconds). The rolling shutter correction module 324 determines the boost $rse_t$ for multiple times/frames t (e.g., over 10% of the frames of a 6 second clips, over several hundred milliseconds, or over some other time duration). If a threshold percentage of the frames (e.g., 30-100%) exhibit a boost above the specified threshold, then the rolling shutter detection module 324 concludes that a rolling shutter effect is present for a set of frames. If the threshold percentage of frames is not met, the rolling shutter detection module 324 concludes that a rolling shutter effect is not present for the set of frames.

In another implementation, the rolling shutter detection module 324 detects rolling shutter effects using a number of different homographic mixture models $F_t^{(2,\lambda)}$, where each of the homographic mixture models varies with respect to the regularizer $\lambda$. As above, a sufficiently high regularizer causes the homographic mixture model to be rigid and thus identical to the homographic model. Relatively low regularizer values (e.g., $3 \times 10^{-5}$) better model heavy distortions originating from fast vibrating camera centers (e.g., mounting of the camera on a helicopter or motorbike). Relatively high value regularizer values (e.g., $4.7 \times 10^{-4}$) model relatively slower moving distortions (e.g., a person walking with a camera, a video shot from a boat).

According to this implementation, to detect rolling shutter effects for a frame pair, the motion estimation module 310 estimates a number (e.g., four) homographic mixture models for the frame pair, where each homographic mixture model has a different regularizer. The rolling shutter detection module 324 determines the grid coverage $G_t^{(2,\lambda)}$ and boost $rse_{t,\lambda}$ for each of the homographic mixture models with respect to the estimated homographic model $F_t^{(2)}$. Due to the difference in the regularizer, each homographic mixture model $F_t^{(2,\lambda)}$ will have a different boost $rse_{t,\lambda}$.

The different homographic mixture models allow for more precise modeling of different types of rolling shutter effects. To determine whether a rolling shutter effect is present for a frame and to determine which homographic mixture model to apply, the boost of each homographic mixture model is compared against a different boost threshold. More rigid homographic mixtures have their boosts $rse_{t,\lambda}$ compared against comparatively lower boost thresholds (e.g., a boost threshold 1.1-1.3). Less rigid homographic mixtures have their $rse_{t,\lambda}$ compared against higher boost thresholds (e.g., 1.5-1.9). In one embodiment, the homographic mixture with least rigid regularizer that meets the boost threshold (or stated differently, the homographic mixture meeting the highest boost threshold) is the homographic mixture used for that frame. In one embodiment, the various boost thresholds are configured such that if a lower regularizer boost threshold is met, the thresholds of all higher regularizer thresholds will also be met.

To determine whether a rolling shutter effect is present across a set of frames, the homographic mixture models that meet the various boost thresholds are compared. In one embodiment, if a percentage (e.g., 5-15%, or higher) of the frames of the set meet one of the boost thresholds, then it is determined that a rolling shutter effect is present.

II.B.ii.b Correcting Rolling Shutter

To correct for rolling shutter effects, the rolling shutter correction module 324 is configured to alter the set of valid estimated motion models received from motion estimation module 310. In one embodiment, if a rolling shutter effect is determined to be present across a set of frames, the valid motion models for that set of frames is permitted into include previously determined valid estimated homographic mixture models $F_t^{(3)}$ for those frames. If a rolling shutter effect is determined not to be present across a set of frames, the valid estimated motion models for that set of frames is constrained to motion models having eight DOF (e.g., homographic models $F_t^{(2)}$, or lower. In another embodiment, if a rolling shutter effect is determined to be present across a set of frames, the valid motion models for that set of frames are upgraded such that homographic mixture models $F_t^{(3)}$ are considered valid for all frames in the set.

To correct for rolling shutter effects in an implementation where multiple homographic mixture models were determined, the rolling shutter correction module 324 determines first whether or not a rolling shutter effect is present, and if a rolling shutter effect is present, which of the homographic mixture models to use for a set of frames. As above, if a rolling shutter effect is determined not to be present, across a set of frames, the valid estimated motion models for that set of frames is constrained to motion models having eight DOF (e.g., homographic models $F_t^{(2)}$), or lower. If a rolling shutter effect is determined to be present, the homographic mixture model $F_t^{(2,\lambda)}$ used is the homographic mixture model meeting the boost threshold for the specified percentage of frames in the set. If more than one homographic mixture model meets this condition, the rolling shutter correction module 324 uses the homographic mixture model with the weakest regularizer for the frames in the set. As above, depending upon the implementation this homographic mixture model may be used for all frames in the set or only for those frames where the estimated homographic mixture model for that frame was determined to be valid.

II.B.iii. Overlay and Blur Correction

The overlay and blur correction module 326 flags frames (or frame pairs) exhibiting a large amount of blur or significant static overlay, and is one means for performing this function. The flags are used to place restrictions on the camera path itself and/or its use in generating the stabilized video.

A static overlay is identified in a frame by identifying those tracked features $T_{t,i}$ exhibiting near zero motion $M_{t,i}$ (e.g., less than 0.2 pixels) as well as significantly small relative motion with respect to the dominant camera translation (e.g., <20%). These tracked features are indicated to be static. The overlay and blur correction module 326 aggregates the determinations that individual tracked features are static to determine whether a frame as a whole has a static overlay. To do this, the frame is divided into cells using a grid as described above. If more than 30% of a cell's tracked features are indicated as static, the cell is determined to be static. If a cell at given time t is indicated as being an overlay, that indication is propagated to a number of nearby frames (e.g., 30), as static overlays are typically present for more than a fraction of a second. If a sufficient number of cells of the grid are indicated as having an overlay, the entire frame is flagged as containing an overlay. This process is repeated for the other nearby frames, which may be similarly flagged. These flags indicate the presence of a static overlay, which may be taken into account in generating the stabilized video, described further below.

Motion blur, or simply blur, is detected based on an corner measure of the pixels used in the detection. The corner measure here is similar to the corner measure used in tracking, above. For detecting blur, however, the corner measure may performed with different parameters and thresholds than is used for tracking. A blur score is determined for each frame using the corner measure.

The overlay and blur correction module 324 is configured to flag an individual frame as blurred based on the frame's blur score. To flag a frame as blurred, the frame's blur score is compared to the blur score of each of a number of nearby frames (e.g., 50 nearby frames) to determine a ratio between the blur score of the frame in question to the blur score of each nearby frame. This ratio is determined separately for each of those nearby frames. The ratios may be weighted based on a number of factors including, for example, the time (or frame count) difference between the frame in question and the nearby frame on which the ratio is based, and the frame area overlap/intersection between the frame in question and the nearby frame. If one or more of the ratios is above a threshold (e.g., 2.5), the frame in question is flagged as blurry.

II.C. Camera Path Stabilization

The camera path stabilization module 330 generates a smoothed camera path and a crop transform (or simply crop), and is one means for performing this function. The camera path stabilization module 330 receives as input the tracked features T and motions M generated by motion estimation 310, the set of valid estimated motion models F as generated by the motion estimation module 310 and as refined by the camera path analysis module 320, and any flags generated by the camera path analysis module 320.

As introduced above, the camera path 306 may be output separately. This output camera path 306 may include the estimated motion models and/or the smoothed path and crop generated by the camera path stabilization module 330. The smoothed camera path and crop can also used as an input to the stabilized video module 340 to generate a stabilized video 304. The camera path stabilization module 330 includes a camera path smoothing module 332 and a cropping module 334.

II.C.i. Camera Path Smoothing

The camera path smoothing module 332 smoothes the camera path by generating a smoothed path P that eliminates shake due to similarity (4 DOF), and lower DOF camera motions. The smooth path P does not take into account or correct higher DOF (e.g. more than 4) motion. The camera path smoothing module 332 generates the smoothed path of a frame at time $P_t$ using an L1 path stabilization and the estimated valid translation $F_t^{(0)}$, similarity $F_t^{(1)}$, and identity motion models, and is one means for performing this function. The camera path $P_t$ at time t is calculated using $$C_t = C_{t-1} F_t^{(1)} \tag{12}$$

and $$P_t = C_t B_t \tag{13}$$

$P_t$ includes a series of segments, each segment being one of a constant, linear, and/or parabolic motion. To accomplish this segmentation, $P_t$ is estimated by using a constrained L1 optimization $$O(P) = \alpha_1 |DP(t)|_1 + \alpha_2 |D^2 P(t)|_1 + \alpha_3 |D^3 P(t)|_1 \tag{14}$$

where D is the differential operator. The result of camera path smoothing is a two dimensional (e.g., along the x and y axes) function $P_t$ that minimizes O(P). As above, as $P_t$ is based only on the similarity model $F_t^{(1)}$, $P_t$ does not fully represent the camera path. Generally, the smoothed camera path $P_t$ in combination with the higher DOF motion models (translation, homographic, homographic mixture), represents the camera path 306 in its entirety.

$B_t$ represents the crop transform to be applied to the frame at time t to make a stabilized video 304 generated using the camera path appear if it was captured along the smooth path $P_t$, thereby stabilizing the video. In one embodiment, the CLP (Computational Infrastructure for Operations Research (COIN-OR) Linear Programming) simplex solver is used to determine $B_t$. Crop determination is further described with respect to the cropping module 334, below.

Thus, camera path smoothing module 332 is configured to output the smoothed camera path $P_t$ based on the crop $B_t$ from the cropping module 334 and based on the estimated similarity motion model from each frame pair. If the similarity model for a given frame is not valid, a translation or identity model can be used in place of the similarity model in determining the smoothed path and crop.

II.C.ii. Cropping

The cropping module 334 is configured to determine the crop $B_t$ of each frame, and is one means for performing this function. The crop governs the size of the frame. For fully automatic video stabilization, the crop $B_t$ is determined by the camera motions present in the video. Generally, the cropping module 334 is configured to find a crop $B_t$ that crops the content of each frame such that the remaining portion of the frame has the freedom to compensate for unwanted motion by adjusting what part of each frame is shown. Although larger crops generally make this easier, very large crops have the effect of removing frame content without providing additional stabilization benefit.

The cropping module determines the crop $B_t$ using Eq. (14) and by testing out several different crop window sizes to determine the crop $B_t$ that at least approximately minimizes $O_i(P_t)$ of Eq. (14), where i represents the i-th crop test. In one embodiment, the crops tested include a 95% crop, a 90% crop, an 85% crop, and so on, down to a lower threshold such as a 70% crop. In one embodiment, the optimal crop $c_{opt}$ is based on an absolute threshold $a_s$ and a relative threshold $r_s$. Examples values include $a_s$=0.002 and $r_s$=0.8.

$$c_{opt} = \max_i \begin{cases} c_i & \text{if } O_i < a_s \text{ or } \frac{O_{i-1}}{O_i} > r_s \\ c_n & \text{otherwise} \end{cases} \quad (15)$$

The optimal crop size $c_{opt}$ is a percentage of the frame rectangle. As above, the crop transform $B_t$ is independent of crop size. Although it would be possible to exactly determine, for each frame, the exact crop that minimizes O(P), finding the exact ideal crop is inefficient from a processing standpoint. Even testing just a few crops, as described above, can be computationally intensive. In one embodiment, to improve the efficiency of the determination of the optimal crop $c_{opt}$ for each frame, temporal subsampling is performed on every k-th frame (e.g., if k=3, the temporal subsampling is performed on every third frame) to determine the optimal crop $c_{opt}$. This reduces the number of times the optimal crop $c_{opt}$ needs to be determined in total, thus reducing the total processing required to determine the camera path. In one embodiment, the determination of the optimal crop $c_{opt}$ for a temporally subsampled frame is, rather than being based on Eq. (14), is instead based on:

$$O(P) = \alpha_1 k |DP(kt)|_1 + \alpha_2 k^2 |D^2 P(t)|_1 + \alpha_3 k^3 |D^3 P(kt)|_1 \quad (16)$$

The determination of crop transform $B_t$ includes a number of constraints. First, the four corners $c_k$ of a crop window have a predetermined size less than the frame size. The size of the corners is determined to remain within in the frame after the transformation, e.g., $[0,0] \leq B_t c_k <$ [width, height] at all times for all four corners. The values of $c_k$ are based on the crop transform and the magnitude of the crop as determined by $c_{opt}$. This prevents undefined out-of-bound areas after applying the crop $B_t$, alleviating the need for costly motion inpainting. Second, bounds are placed on the degrees of rotation allowed by the crop (e.g., 15°) and the change in scale (e.g., 90%) allowed by the crop. This limits the absolute deviation from the camera path $P_t$. Third, if a frame is flagged as exhibiting a sufficiently large overlay, the crop $B_t$ is constrained to an identity transform. Fourth, if a frame is flagged to be motion blurred, a inequality constraint is placed, such that $P_t$ preserves a portion (e.g., 60%) of the original camera motion, thereby suppressing the perceived blur in the result at the cost of more shakiness. This may be isolated to one frame, or spread across several adjacent frames. Fifth, the scale of the $c_{opt}$ of the crop is added, with a small negative weight, to the objective as described in Eq. (14), effectively applying an inverse spring force on the crop window to bias the result towards less cropping.

In one embodiment, the crop transform $B_t$ is determined on clips (or portions) of the video at a time (e.g., 6 seconds at a time). Additional constraints may be placed on individual clips that are not necessarily applicable to future clips. First, the crop window is biased to be axis aligned and frame centered for the first frame of a clip (e.g., zero translation, a scale of 1, and zero rotation). This constrains the initial orientation for the crop of a clip. Second, if the translation model of the first frame of the clip was deemed invalid, the identity model is embedded in the similarity model and the crop transform is centered for the first frame of the clip. Third, if the similarity model of the first frame of the clip was deemed invalid, the identity model is embedded in the similarity and change in rotation and scale of the crop across frames of that clip is set to zero (e.g., only translational DOFs are allowed).

II.D. Stabilized Video Generation

The stabilization video module 340 is configured to generate a stabilized video 304 using the set of valid motion models $F_t^{(k)}$ and crop transform $B_t$ from each frame pair, and is one means for performing this function. In one embodiment, to generate the stabilized video 304, the stabilized video module 340 generates a stabilized frame $J_t$ for each input frame $I_t$ from the original input video 302. In one embodiment, the stabilized video module 340 generates each stabilized video frame $J_t$ by resampling the original frames $I_t$ according to the crop $B_t$, and by correcting the resampling to account for any residual motion according to:

$$J_t(x) = I_t(y_t) = I_t\left(\frac{R_t B_{t-1} x}{H_t}\right) \quad (17)$$

where x is the Cartesian coordinate axes of the pixels of the frame, where $R_t$ represents the residual motion:

$$R_t = \frac{B_t F_t^{(1)}}{B_{t-1}} \quad (18)$$

and where $H_t = F_t^{(k*)}$ and where k* equals 2 or 3, whichever is the highest DOF valid estimated motion model for that frame.

Resampling $I_t$ according to $B_t$ corrects for camera motions have similarity (e.g., DOF=4) or lower (e.g., translation) DOF. However, this resampling does not take into account higher DOF camera motions, such as those captured by the homographic and homographic mixture models. If no further correction were performed, such higher DOF motions would appear as high frequency residual wobble distortions in the resulting stabilized frames. The additional terms $H_1$ and $R_t$ account for such higher DOF motions on a frame by frame basis. They affect the output frames $J_t$ where there is a homographic and/or homographic mixture model that has been determined to be valid for that frame.

In practice, to solve Eq. (17) including the residual $R_t$, Eq. (17) is recursively expanded as:

$$J_t(x) = I_t(y_t) = I_t\left(\frac{R_t}{H_t} \frac{R_{t-1}}{H_{t-1}} \cdots \frac{R_t B_p}{H_p} x\right) \quad (19)$$

until some earlier time/frame p. Two key frames at times t=p and t=n are fixed. Simple resampling is used, i.e., $J_t(x)=I_t(B_t x)$ such that $t \in \{p,n\}$. For intermediate frames t: p<t<n, Eq. (19) is used to recursively compute the resampling location $y_t^{(p)}$ from p to t and $y_t^{(n)}$ using a backward chain from n to t. The two resampling locations are then linearly blended (or interpolated) to determine the final value of $J_t(x)$, such that $$J_t(x) = I_t(y_t) = I_t\left(\frac{(t-p)y_t^{(p)} + (n-t)y_t^{(n)}}{n-p}\right) \quad (19)$$

More generally, the stabilized video module 340 generates the frames $J_t$ by applying the crop $B_t$ and the estimated valid motion models $F_t$ directly to the pixels of each frame $I_t$. The estimated motion models dictate a location where each pixel from each frame will appear after stabilization, if at all, as dictated by the crop. This process may be completed for all available frames to generate the stabilized video 304.

II.E. Camera Shake Detection

II.E.i Overview

The shake detection module 360 is configured to analyze videos to determine whether or not a video 302 would benefit from stabilization, as not all videos will benefit. The process of determining whether or not a video would benefit from stabilization is referred to as camera shake detection, or simply shake detection. The shake detection module 360 is configured to quantify an amount of shake in a video by generating a number of shake features. The shake features are used to determine whether or not to stabilize the video 302.

Shake detection may be performed automatically or subject to a received request. Responsive to performing shake detection, a conclusion may be reached regarding whether the video has enough shake relative to a threshold to merit stabilization. Stabilization may be performed automatically upon reaching the threshold, or alternatively the user inputting the video 302 may be prompted with the option of performing stabilization based on the conclusion of the shake detection module 360.

The threshold for determining that a video would benefit from stabilization may vary between implementations. For videos with very little camera motion (or shake), stabilization may actually make the video worse (e.g., more difficult to watch as a viewer) than if no stabilization were performed. The threshold may be set such that stabilization is only performed if it improves the video. Processing costs involved with performing stabilization may also be a factor. The threshold may also be set such that stabilization is only performed if it improves the video enough to justify the processing cost. Thus, the threshold for determining whether to apply stabilization may vary between implementations.

II.E.ii Generating Shake Features

As introduced above, to determine whether to apply stabilization to a video, the shake detection module 360 is configured to quantify the shake present in the video by generating a number of shake features. To generate the shake features, the shake detection module 360 generates a number of spectrograms S for the video 302 based on the estimated similarity models $C_t$ for the frames of the video (see Eq. (12)).

Each spectrogram S describes the frequency (or energy) components of the value of a single DOF of the similarity model across a number of adjacent frames. Thus each spectrogram represents either a DOF of translation G along the x coordinate axis, a DOF of translation G along the y coordinate axis, a DOF of scale change, or a DOF of rotation change. As described above, the value of each DOF for a frame is represented by a parameter in the motion model, thus the value of each similarity DOF is the value of the corresponding parameter in the estimated similarity motion model $F_t^{(1)}$ for that frame.

Each spectrogram S also covers a limited time window of frames (e.g., 128 frames, or about 5 seconds of video. The spectrograms also partially overlap with each other in time, such that two spectrograms may share frames. For example, a first spectrogram may be based on frames 0-128, a second spectrogram may be based on frames 64-196, and a third spectrogram may be based on frames 128-256.

The spectrogram S is generated in a frequency coordinate system where the portion of the spectrogram $S_k$ for each frame k is generated using the DOF values across the frames of the window and using a Fourier transform such as the Discrete Cosine Transform (DCT)-II algorithm:

$$S_k = |D_k| = 2\sum_{n=0}^{127} d_n \cos\left(\pi \frac{k}{128}(n+0.5)\right), k = 0 \ldots 127, \quad (19)$$

for an implementation using 128 frames per spectrogram, where $d_n$ represents the amount of contribution of a particular frequency/energy to the DOF values for the frames of the window. An individual portion of the spectrogram $S_k$ can be stored, in the data storage 350, as a histogram comprising 128 bins, each bin representing a particular frequency/energy range. Each bin has a height of $d_n$ representing that bin's contribution to the DOF values of the frames of the window. Thus, in $S_k$ a comparatively tall bin indicates that the frequency/energy range of that bin contributes more strongly to the values of the DOF in the window compared to another, comparatively shorter bin. Generally, taller spectrogram bins at higher frequencies/energies represent more vigorous camera motions such as rapid shaking of the camera. Conversely, taller histogram bins at lower frequencies/energies represent slower camera motions. Spectrogram S aggregates the DOF values for the frames of a time window into a histogram having a number of bins, where each bin represents a different frequency (or energy) range's contribution to the DOF's value for the frames in the window.

Spectrograms may be compressed to help save memory space. In one embodiment, a scale 2 compression is used as it is generally expected that most energy in most video 302 spectrograms will be found at lower energies. A scale of 2 aggregates all frequencies in the interval $[2^n, 2^{n+1}]$. resulting in a total of 8 bins for the spectrogram ($2^8=128$) rather than the 128 bins from the example above. Thus, in performing compression the contributions $d_n$ of similar energy ranges are aggregated together. Using the example above, after compression rather than their being 128 $d_n$ values, each portion of the spectrogram $S_k$ instead has 8 $d_n$ values, one for each energy bin.

Figures 9A, 9B:
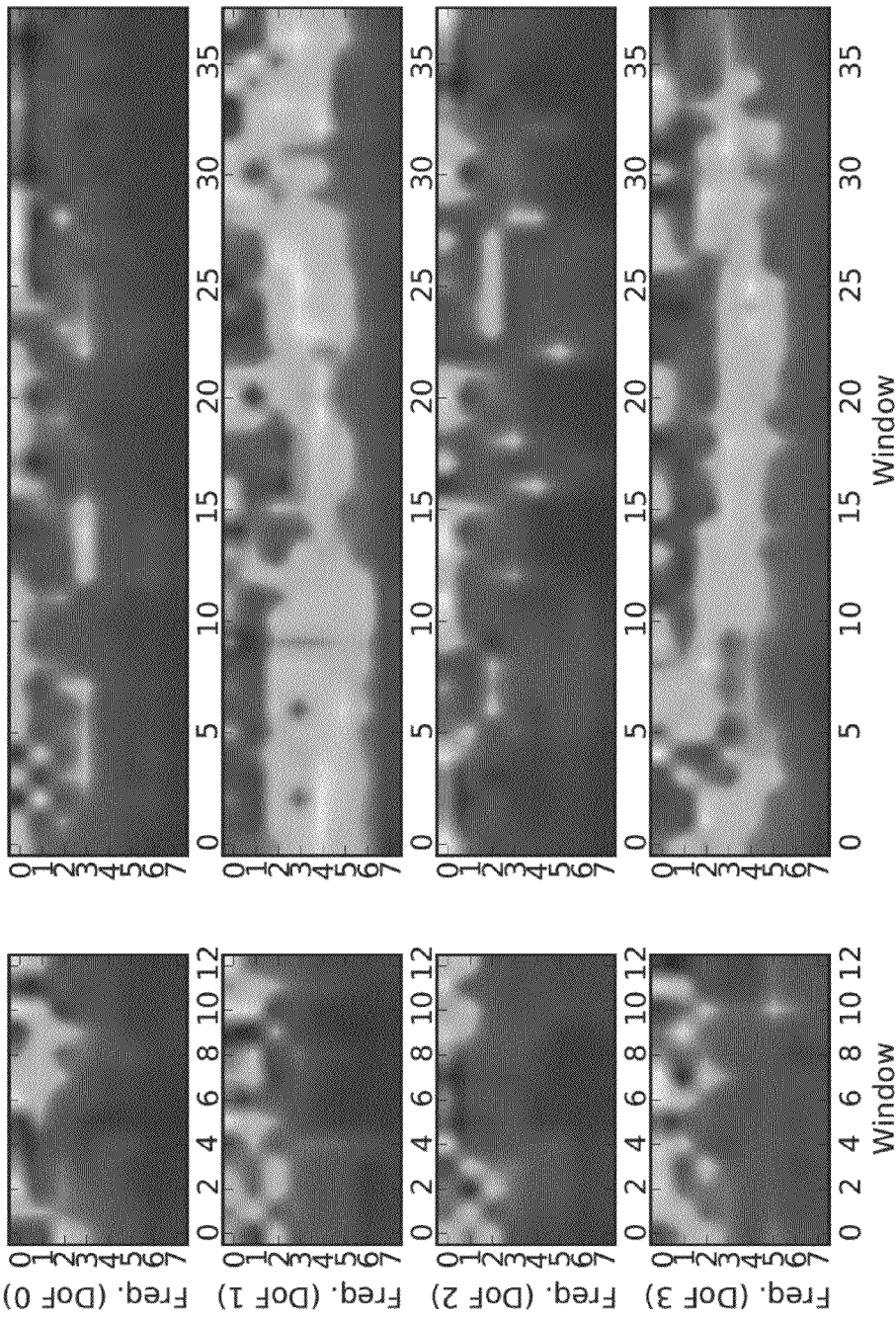
FIGS. 9A and 9B illustrate a number of spectrograms for a number of time windows and for the different degrees of freedom of the similarity model, where

FIG. 9 is an illustration of a number of spectrograms for a number of time windows and for the different degrees of freedom of the similarity model, according to one embodiment. FIG. 9A illustrates the spectrograms of a first, short-length video 12 windows in length, and FIG. 9B illustrates the spectrograms of a second, longer-length video 40 windows in length. A separate graph is illustrated for each DOF of the similarity model for each video. The example graphs of FIG. 9 assume 128 frames per spectrogram, scale 2 compression and thus 8 energy bins per spectrogram, and approximately 50% window overlap in the frames of each spectrogram. They axis of each graph illustrates the 8 energy bins, with bin number increasing with respect to energy. The x axis of each graph illustrates the spectrograms of the video by window. The color of each pixel of the graph represents the amount of energy (i.e., motion) within a particular frequency range within each window of frames.

Comparing the spectrograms of FIG. 9A and FIG. 9B, the shorter video has very little shake of the DOFs at higher energies, where as the longer video has significant amounts of shake at higher energies. Thus, it may be concluded that the longer video would more greatly benefit from stabilization relative to the shorter video.

The shake features may be generated from the spectrograms using any one of several different methods including, for example, based on the mean, median, and/or maximum of spectrogram histogram bin height across all windows and based on a separate histogram that groups the spectrogram's energy according to percentile. Each of these methods is now described in turn.

One or more sets of shake features may be generated from the spectrograms by taking one or more of the mean, maximum, and median spectrogram height of each bin across the windows of a video. As introduced above, the height of a bin of a spectrogram represents the contribution of particular range of energies/frequencies to the DOF values of the windows on a window per window basis. Thus, the mean across all windows represents the average contribution of that bin's frequencies/energies to the video as a whole by window across the windows of the video. Similarly, the maximum across all windows represents the maximum contribution of that bin's frequencies/energies to the video as a whole by window across the windows of the video, and the median across all windows represents the median contribution of that bin's frequencies/energies to the video as a whole by window across the windows of the video. Using the example conditions above, if there 8 energy bins per DOF and given that there are 4 DOFs in the similarity model, consequently the shake detection module 360 generates 32 mean shake features, 32 maximum shake features, and 32 median shake features for a video. Note that the number of shake features generated is independent of the length (e.g., number of windows) of the video.

Another set of shake features may be generated by from the spectrograms by creating a separate set of histograms of the spectrogram domain, one domain histogram for each energy bin for each DOF, and thus using the exemplary conditions above, 32 domain histograms total (e.g., 8 energy bin times 4 DOF). Each domain histogram has a number of bins (referred to as domain bins to avoid confusion with the energy bins of the underlying spectrograms). Each domain bin has its own shake feature. Continuing with the example from above, if each domain histogram has 10 domain bins, then the shake features generated by this technique number 320 in total.

A domain histogram groups the heights/contributions, $d_n$, of the individual windows of a single energy bin (e.g., one of 0-7) of spectrogram into percentile ranges of contribution relative to all energy bins of the spectrogram across all windows. The domain histogram is normalized on a scale of, for example, [0,1], where 0 represents a contribution value $d_n$ of zero, or alternatively the lowest amount of contribution $d_{n,\,min}$ in the spectrogram, and 1 represents the highest amount of contribution $d_{n,\,max}$ in the spectrogram.

Each domain bin covers a defined percentile range of contribution values. The height of each domain bin is the number of windows in the energy bin having that contribution values $d_n$ within that percentile range. For example, if each of 10 domain bins covers a 10% range, a height of a first domain bin indicates the number of windows of the energy bin (e.g., spectrogram bin 0 out of bins 0-7) having contribution values $d_n$ between 0-10% the contribution of the maximum contribution of any bin in the spectrogram. A height of a second domain bin indicates the number of windows of that same energy bin (e.g., again spectrogram bin 0) having contribution values $d_n$ between 11-20% the contribution of the maximum contribution of any bin in the spectrogram.

The heights of the domain bins may be normalized by the total number of windows in the video so that the domain bins are invariant with respect to the length of the video. This allows domain bin shake features from videos of various lengths to be compared despite having differing numbers of windows.

II.E.iii Determining Whether to Stabilize the Video

The shake features are analyzed to determine whether to apply stabilization to a video. In one implementation, the shake detection module 360 uses machine learning algorithms to trains a shake classifier to determine whether to apply stabilization. To train the shake classifier, the shake detection module 360 uses shake features from known videos and determinations (e.g., yes, no) of whether these known videos would be stabilized as training inputs. By training the classifier with decisions about whether these known videos would or would not be stabilized, the shake classifier is trained to learn whether or not later received videos 302 should be stabilized.

The shake features used to train the shake classifier may vary between implementations. In one embodiment, 32 mean shake features, 32 maximum shake features, and 320 domain shake features are used to train the classifier. In other embodiments, any combination of mean, max, median, and domain shake features may be used to train the classifier. In other embodiments, additional features of the video may also be used to train the classifier. These features may include, for example, features deduced from the blur present in the video, as well as non-shake features such as the scene content of the video, and the audio of the video.

Once the shake classifier has been trained, a video 302 may be analyzed to determine whether or not to stabilize the video. The shake detection module 360 processes the video to generate shake features as described above. The shake features (and any other features are input to the shake classifier. The shake classifier then outputs a determination of whether or not the video should be stabilized. Stabilization may then be automatically conducted, or conducted responsive to a user input.

III. Example Methods

Figure 4:
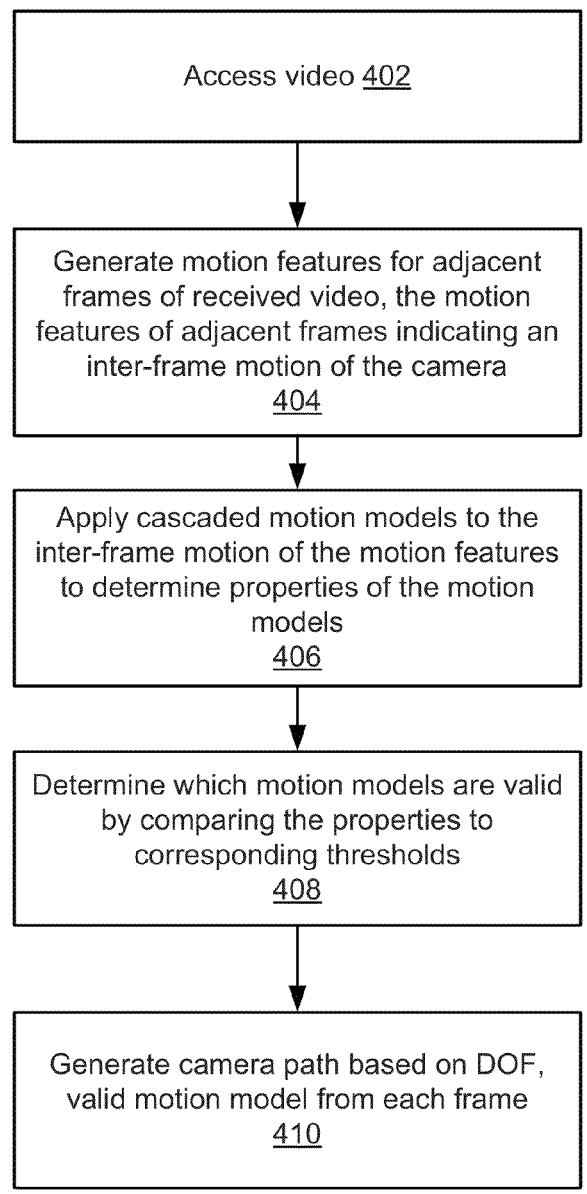
FIG. 4 is a flowchart illustrating a process for determining a camera path of a video, according to one embodiment.

FIG. 4 is a flowchart illustrating a process for determining a camera path of a video, according to one embodiment. The stabilization server 112 accesses 402 a video and generates 404 two dimensional tracked features for at least two adjacent frames of the received video. The tracked features of the adjacent frames indicate an inter-frame motion of the camera. A number of different motion models are each individually applied 406 to the tracked features of a frame to determine properties of the motion models. Each motion model has a different number of DOF. Based on the properties, a determination 408 is made regarding which of the motion models are valid. A camera path 410 describing the motion of the camera used to capture the video is generated based on the motion models that are valid for the inter-frame motion between the adjacent frames.

Figure 5:
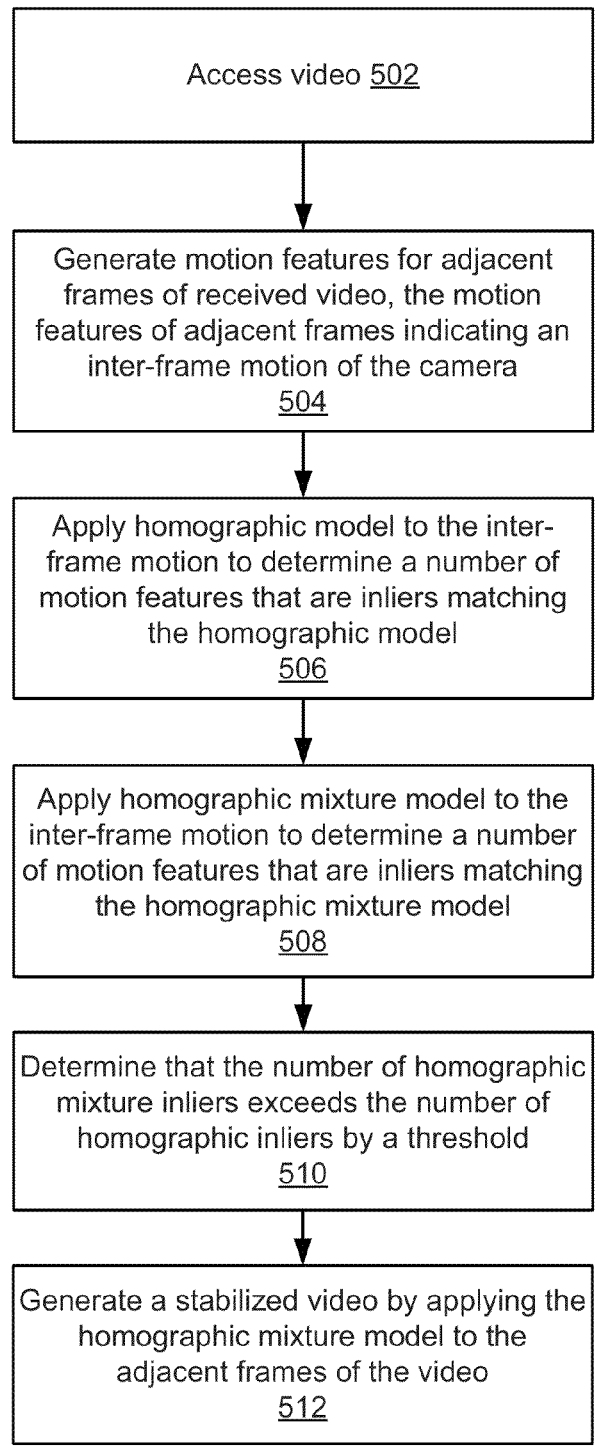
FIG. 5 is a flowchart illustrating a process for detecting and correcting rolling shutter in a video, according to one embodiment.

FIG. 5 is a flowchart illustrating a process for detecting and correcting rolling shutter in a video, according to one embodiment. The stabilization server access 502 a video and generates 504 two dimensional tracked features for at least two adjacent frames of the received video. The tracked features of the adjacent frames indicate an inter-frame motion of the camera. A homographic model is applied 506 to the inter-frame motion to determine a number of tracked features that are inliers matching the homographic model. A homographic mixture model is applied 508 to the inter-frame motion to determine a number of tracked features that are inliers matching the homographic mixture model. Responsive to determining 510 that the number of homographic mixture inliers exceeds the number of homographic inliers by a threshold, a determination can be made that the video exhibits a rolling shutter effect. A stabilized is generated by applying the homographic mixture model to the adjacent frames of the video.

Figure 8:
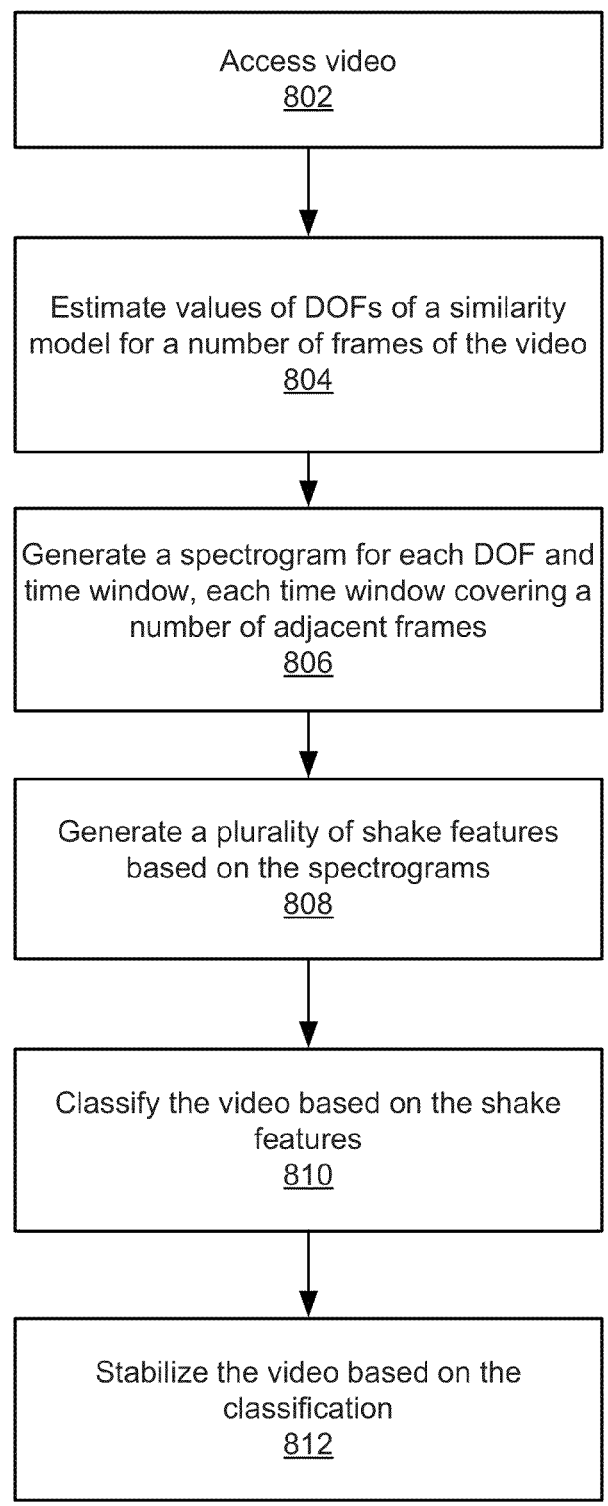
FIG. 8 is a flowchart illustrating a process for detecting camera shake in a video, according to one embodiment.

FIG. 8 is a flowchart illustrating a process for detecting camera shake in a video, according to one embodiment. The stabilization system 112 accesses 802 a video and estimates 804, for a number of frames of the video, values (or parameters) of the DOFs of a similarity motion model as described above. The stabilization system 112 generates 806 a spectrogram for each DOFs and time window, such that each spectrogram is based on the values of the DOFs over a time window comprising a plurality of adjacent frames of the video. Using the spectrograms, the stabilization system 112 generates 808 shake features based on the spectrograms. The stabilization system 112 classifies 810 the video based on the shake features and a previously trained shake classifier. The shake classifier classifies 810 the video into one of two categories, videos that should be stabilized and videos that should not be stabilized. Based on the classification, the stabilization system 812 stabilizes the video based on the classification, either automatically or responsive to a user input.

IV. Additional Considerations

The above description is included to illustrate the operation of the embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer implemented method comprising:
accessing a video;
generating a plurality of tracked features for each of at least two adjacent frames of the video, the tracked features of the adjacent frames indicating an inter-frame motion of the camera;
applying a translation motion model comprising two degrees of freedom (DOF) to the inter-frame motion of the tracked features to estimate a plurality of translation properties for the translation motion model;
determining whether the translation motion model is valid by comparing the translation properties to corresponding translation property thresholds;
responsive to determining that the translation motion model is valid:
applying a similarity motion model comprising four DOF to the inter-frame motion of the tracked features to estimate a plurality of similarity properties for the similarity motion model;
determining whether the similarity motion model is valid by comparing the similarity properties to corresponding similarity property thresholds; and
responsive to determining that the similarity motion model is valid:
applying a homographic motion model comprising eight DOF to the inter-frame motion of the tracked features to estimate a plurality of homographic properties for the homographic motion model; and
determining whether the homographic motion model is valid by comparing the homographic properties to corresponding homographic property thresholds;
generating a camera path between the adjacent frames based on a highest DOF motion model having a greatest number of DOF out of one or more valid motion models; and
generating a stabilized video by applying the camera path to the adjacent frames of the video.

2. The method of claim 1, wherein the camera path is generated independent of data describing the motion of an original camera used to capture the video.

3. The method of claim 1, wherein generating the plurality of tracked features for one of the frames comprises:
applying a corner measure to the frame to generate the tracked features at a plurality of locations having high color gradient along both coordinate axes of the frame.

4. The method of claim 1, wherein the translation properties for validating the translation model comprise at least one from the group consisting of: a number of inlier motion properties, a translation magnitude, and a standard deviation in the translation magnitude.

5. The method of claim 1, wherein the similarity properties for validating the similarity model comprise at least one from the group consisting of: a number of inlier motion properties, a feature coverage with respect to frame area, a scale change, and an amount of frame rotation.

6. The method of claim 1, wherein the homographic properties for validating the homographic model comprise at least one from the group consisting of: a scale change, an amount of frame rotation, an amount of perspective change, and an amount of grid coverage.

7. The method of claim 1, wherein generating the camera path comprises:
determining a highest DOF valid motion model for each of a plurality of pairs of adjacent frames;
comparing a first number of DOF in the highest DOF valid motion model for a first pair of adjacent frames to a second number of DOF in the highest DOF valid motion model for a second pair of adjacent frames immediately preceding or following the first pair of adjacent frames;
responsive to the second number of DOF exceeding the first number of DOF, propagating the highest DOF valid motion model for the first pair of adjacent frames to the second pair of adjacent frames, thereby invalidating the highest DOF valid motion model for the second pair of adjacent frames; and
generating the camera path between the adjacent frames based on the highest DOF valid motion model for each of the pairs of adjacent frames.

8. The method of claim 1, further comprising:
determining that the video exhibits a rolling shutter effect; and
responsive to determining that the video exhibits the rolling shutter effect, validating a homographic mixture model for the adjacent frames, and
generating the stabilized camera path between the adjacent frames based on the homographic mixture model.

9. The method of claim 1, further comprising:
determining that the video does not exhibit a rolling shutter effect; and
responsive to determining that the video does not exhibit the rolling shutter effect, invalidating a homographic mixture model for the adjacent frames, and
generating the stabilized camera path between the adjacent frames without the homographic mixture model.

10. The method of claim 1, further comprising, responsive to determining that the homographic motion model is valid:
applying a homographic mixture motion model to the inter-frame motion of the tracked features to estimate a plurality of homographic mixture properties for the homographic mixture motion model, the homographic mixture motion model comprising eight DOF for each of a plurality of blocks of the adjacent frames; and determining whether the homographic mixture motion model is valid by comparing the homographic mixture properties to corresponding homographic mixture property thresholds.

11. The method of claim 10, wherein the homographic mixture properties for validating the homographic mixture model comprise at least one from the group consisting of: an inlier block coverage, a number of adjacent outlier blocks, and a number of blocks empty of inlier tracked features.

12. A non-transitory, computer-readable medium having instructions stored thereon, the instructions executable by a processor for:

accessing a video;

generating a plurality of tracked features for each of at least two adjacent frames of the video, the tracked features of the adjacent frames indicating an inter-frame motion of the camera;

applying a translation motion model comprising two degrees of freedom (DOF) to the inter-frame motion of the tracked features to estimate a plurality of translation properties for the translation motion model;

determining whether the translation motion model is valid by comparing the translation properties to corresponding translation property thresholds;

responsive to determining that the translation motion model is valid:

applying a similarity motion model comprising four DOF to the inter-frame motion of the tracked features to estimate a plurality of similarity properties for the similarity motion model;

determining whether the similarity motion model is valid by comparing the similarity properties to corresponding similarity property thresholds; and responsive to determining that the similarity motion model is valid:

applying a homographic motion model comprising eight DOF to the inter-frame motion of the tracked features to estimate a plurality of homographic properties for the homographic motion model; and determining whether the homographic motion model is valid by comparing the homographic properties to corresponding homographic property thresholds;

generating a camera path between the adjacent frames based on a highest DOF motion model having a greatest number of DOF out of one or more valid motion models; and generating a stabilized video by applying the camera path to the adjacent frames of the video.

13. The medium of claim 12, wherein the translation properties for validating the translation model comprise at least one from the group consisting of: a number of inlier motion properties, a translation magnitude, and a standard deviation in the translation magnitude.

14. The medium of claim 12, wherein the similarity properties for validating the similarity model comprise at least one from the group consisting of: a number of inlier motion properties, a feature coverage with respect to frame area, a scale change, and an amount of frame rotation.

15. The medium of claim 12, wherein the homographic properties for validating the homographic model comprise at least one from the group consisting of: a scale change, an amount of frame rotation, an amount of perspective change, and an amount of grid coverage.

16. The medium of claim 12, further comprising instructions executable by a processor for, responsive to determining that the homographic motion model is valid:

applying a homographic mixture motion model to the inter-frame motion of the tracked features to estimate a plurality of homographic mixture properties for the homographic mixture motion model, the homographic mixture motion model comprising eight DOF for each of a plurality of blocks of the adjacent frames; and determining whether the homographic mixture motion model is valid by comparing the homographic mixture properties to corresponding homographic mixture property thresholds.

17. The medium of claim 16, wherein the homographic mixture properties for validating the homographic mixture model comprise at least one from the group consisting of: an inlier block coverage, a number of adjacent outlier blocks, and a number of blocks empty of inlier tracked features.

18. The medium of claim 12, wherein generating the camera path comprises:

determining a highest DOF valid motion model for each of a plurality of pairs of adjacent frames;

comparing a first number of DOF in the highest DOF valid motion model for a first pair of adjacent frames to a second number of DOF in the highest DOF valid motion model for a second pair of adjacent frames immediately preceding or following the first pair of adjacent frames;

responsive to the second number of DOF exceeding the first number of DOF, propagating the highest DOF valid motion model for the first pair of adjacent frames to the second pair of adjacent frames, thereby invalidating the highest DOF valid motion model for the second pair of adjacent frames; and generating the camera path between the adjacent frames based on the highest DOF valid motion model for each of the pairs of adjacent frames.

* * * * *